(12) United States Patent
Zhamu et al.

(10) Patent No.: US 11,958,382 B2
(45) Date of Patent: Apr. 16, 2024

(54) GRAPHENE-ENABLED BATTERY FAST-CHARGING AND COOLING SYSTEM AND METHOD OF OPERATING SAME

(71) Applicant: Global Graphene Group, Inc., Dayton, OH (US)

(72) Inventors: Aruna Zhamu, Springboro, OH (US); Yu-Sheng Su, Dayton, OH (US); Bor Z. Jang, Centerville, OH (US)

(73) Assignee: Honeycomb Battery Company, Dayton, OH (US)

( * ) Notice: Subject to any disclaimer, the term of this patent is extended or adjusted under 35 U.S.C. 154(b) by 0 days.

(21) Appl. No.: 16/837,569

(22) Filed: Apr. 1, 2020

(65) Prior Publication Data

US 2021/0313634 A1    Oct. 7, 2021

(51) Int. Cl.
*B60L 58/00*   (2019.01)
*B60L 58/24*   (2019.01)
(Continued)

(52) U.S. Cl.
CPC ............... *B60L 58/24* (2019.02); *B60L 58/27* (2019.02); *B60L 58/33* (2019.02); *B60L 58/34* (2019.02);
(Continued)

(58) Field of Classification Search
CPC .... H01M 10/441; H01M 10/44; H01M 10/46; H01M 10/563; H02J 7/0013; B60L 58/24; B60L 58/27; B60L 58/33; B60L 58/34
See application file for complete search history.

(56) References Cited

U.S. PATENT DOCUMENTS 7,071,258 B1 *   7/2006   Jang ..................... C01B 32/225
                                                     524/496
8,620,506 B2 * 12/2013   Kummer ............ H01M 10/486
                                                     701/22
(Continued)

FOREIGN PATENT DOCUMENTS

CA       2604638 A1 * 10/2006 ........... A01K 1/0158
CN    102170146 A   *  8/2011
(Continued)

OTHER PUBLICATIONS

Chen et al., "Three-dimensional Flexible and Conductive Interconnected Graphene Networks Grown by Chemical Vapor Deposition" Nature Materials (2011) vol. 10, pp. 424-428.
(Continued)

*Primary Examiner* — Naum Levin

(57) ABSTRACT

Provided is a battery charging system, comprising (a) at least one charging circuit to charge at least one rechargeable battery cell; and (b) a heating device to provide heat that is transported through a heat spreader element, implemented fully outside the battery cell, to heat up the battery cell to a desired temperature Tc before or during battery charging. The system may further comprise (c) a cooling device in thermal contact with the heat spreader element configured to enable transporting internal heat of the battery cell through the heat spreader element to the cooling device when the battery cell is discharged. Charging the battery at Tc enables completion of the charging of the battery in less than 15 minutes, typically less than 10 minutes, and more typically less than 5 minutes without adversely impacting the battery structure and performance. Also provided is a battery module or pack working with such a system.

16 Claims, 11 Drawing Sheets

(51) Int. Cl.
  *B60L 58/27* (2019.01)
  *B60L 58/33* (2019.01)
  *B60L 58/34* (2019.01)
  *H01M 10/44* (2006.01)
  *H01M 10/46* (2006.01)
  *H01M 10/653* (2014.01)
  *H02J 7/00* (2006.01)

(52) U.S. Cl.
  CPC ......... *H01M 10/44* (2013.01); *H01M 10/441* (2013.01); *H01M 10/46* (2013.01); *H01M 10/653* (2015.04); *H02J 7/0013* (2013.01)

(56) References Cited

U.S. PATENT DOCUMENTS

| | | | | |
|---|---|---|---|---|
| 9,461,491 | B2* | 10/2016 | Winkler | H02J 7/007194 |
| 9,561,704 | B2* | 2/2017 | Enomoto | F01P 7/165 |
| 9,590,282 | B2* | 3/2017 | Kossakovski | H01M 10/6572 |
| 9,834,114 | B2* | 12/2017 | Hettrich | H04W 4/029 |
| 9,835,390 | B2* | 12/2017 | Zhamu | F28F 21/02 |
| 9,899,711 | B2* | 2/2018 | Piggott | H01M 10/615 |
| 9,959,948 | B2* | 5/2018 | Zhamu | C01B 32/20 |
| 10,186,887 | B2* | 1/2019 | Wang | H02J 7/007 |
| 11,283,068 | B2* | 3/2022 | Perera | H01M 4/1395 |
| 11,374,252 | B2* | 6/2022 | Endo | H02J 7/007192 |
| 11,404,717 | B2* | 8/2022 | Fauteux | H01M 4/505 |
| 11,495,847 | B2* | 11/2022 | Kim | H01M 10/623 |
| 2005/0074666 | A1* | 4/2005 | Kimiya | H01M 10/667 429/62 |
| 2012/0183830 | A1* | 7/2012 | Schaefer | H01M 10/613 429/120 |
| 2013/0108897 | A1* | 5/2013 | Christian | H01M 10/647 429/50 |
| 2015/0010785 | A1* | 1/2015 | Ogawa | H01M 16/006 429/9 |
| 2015/0028070 | A1* | 1/2015 | Lambert | A45C 13/008 224/191 |
| 2016/0019995 | A1 | 1/2016 | Zhamu et al. | |
| 2016/0023563 | A1* | 1/2016 | Wang | B60L 58/12 320/152 |
| 2016/0059733 | A1* | 3/2016 | Hettrich | H04W 4/029 701/2 |
| 2016/0209124 | A1* | 7/2016 | Da Silvaa | F28D 7/082 |
| 2016/0380247 | A1* | 12/2016 | Juzkow | H01M 10/4257 429/99 |
| 2018/0016481 | A1* | 1/2018 | Terada | C09J 133/04 |
| 2018/0183065 | A1* | 6/2018 | Sasaki | H01M 50/431 |
| 2019/0190012 | A1* | 6/2019 | Wu | H01M 4/587 |
| 2019/0319321 | A1* | 10/2019 | Wang | H02J 7/04 |
| 2021/0021001 | A1* | 1/2021 | Chang | H01M 10/486 |
| 2021/0028507 | A1* | 1/2021 | Su | H01M 10/44 |
| 2021/0028509 | A1* | 1/2021 | Su | H02J 7/0021 |
| 2021/0296716 | A1* | 9/2021 | Zhamu | H01M 10/613 |
| 2021/0351413 | A1* | 11/2021 | Zhamu | H01M 50/531 |
| 2022/0153139 | A1* | 5/2022 | Singhal | H01M 50/77 |
| 2022/0199994 | A1* | 6/2022 | El-Kady | H01M 4/583 |
| 2022/0246363 | A1* | 8/2022 | Losic | H01G 11/06 |

FOREIGN PATENT DOCUMENTS

| | | | | |
|---|---|---|---|---|
| CN | 105914428 A | * | 8/2016 | ......... H01M 10/617 |
| CN | 106129480 A | * | 11/2016 | |
| CN | 106299546 A | * | 1/2017 | ......... H01M 10/613 |
| CN | 206116564 U | * | 4/2017 | |
| CN | 106960925 A | * | 7/2017 | |
| CN | 206697533 U | * | 12/2017 | |
| CN | 109361039 A | * | 2/2019 | |
| CN | 208915338 U | * | 5/2019 | |
| CN | 209993706 U | * | 1/2020 | |
| CN | 110880629 A | * | 3/2020 | |
| CN | 210430029 U | * | 4/2020 | ........ H01M 10/0525 |
| CN | 110407571 B | * | 9/2022 | ............. C04B 35/14 |
| DE | 4205992 A1 | * | 9/1993 | ......... H01M 10/443 |
| DE | 212012000223 U1 | * | 8/2014 | ............... F28D 1/00 |
| DE | 102018210646 A1 | * | 1/2020 | ............. F16J 15/02 |
| WO | WO-2005019132 A1 | * | 3/2005 | ............. B82Y 30/00 |
| WO | WO-2012097456 A1 | * | 7/2012 | ............. H01M 10/36 |

OTHER PUBLICATIONS

Choi et al., "3D Macroporous Graphene Frameworks for Supercapacitors with High Energy and Power Densities" ACS Nano (2012) vol. 6, pp. 4020-4028.

Jang et al., "Processing of Nano Graphene Platelets (NGPs) and NGP Nanocomposites: A Review" J. Materials Sci. (2008) vol. 43, pp. 5092-5101.

Xu et al., "Self-Assembled Graphene Hydrogel via a One-Step Hydrothermal Process" ACS Nano (2010) vol. 4, No. 7, pp. 4324-4330.

* cited by examiner

US 11,958,382 B2

GRAPHENE-ENABLED BATTERY FAST-CHARGING AND COOLING SYSTEM AND METHOD OF OPERATING SAME

FIELD

The present disclosure relates generally to the field of batteries and, in particular, to batteries that are fast rechargeable and related battery charging systems.

BACKGROUND

Electric vehicles (EVs) are viewed as a promising solution to $CO_2$ emission and climate change issues. Batteries have been at the heart of the rapidly emerging EV industry. Despite the dramatic drop in cost of lithium-ion batteries (LiBs) over the past decade (from higher than US$1,000/kWh to less than US$200/kWh), the EV market still accounts for only ~1% of annual light-duty vehicle sales. Range anxiety, the fear that an EV may run out of battery power during a trip, has long been regarded as a key reason for consumers' reluctance to adopt EVs. This issue of range anxiety is exacerbated by the notion that recharging batteries in an EV usually take much longer time to recharge than refueling internal combustion engine vehicles (ICEVs).

To be competitive with ICEVs, fast charging of EVs should be weather-independent and should be comparable in the required length of time as refueling a gasoline car. Variations in temperatures in different geographic regions and different seasons of a given region have posed a challenge to fulfill the need to have fast charging of EV batteries since EV batteries (e.g. lithium-ion batteries) can behave vastly different at different charging temperatures. In winter, half of the United States and most of Northern Europe has an average temperature below 0° C. None of today's EV batteries allow for fast charging at low temperatures. For instance, according to the owner's manual, Nissan Leaf can be charged to 80% full in 30 min (~2 C charge rate) at room temperature, but would take >90 min (<C/1.5 charge rate) to charge the same amount of energy at low temperatures. Such a long recharge time is considered as necessary to avoid lithium plating on anode material surfaces. Currently, LiBs typically use graphite as anode material, which has a lithium intercalation potential within 100 mV vs. Li/Li+. Under some extreme conditions, the large anode polarization can bring graphite potential below the threshold for lithium plating.

The deposited lithium on anode material surfaces reacts quickly with the electrolyte, resulting in irreversible capacity loss. Additionally, the metallic lithium can grow into dendrites, which can penetrate through the separator, reaching the cathode to induce internal shorting. To prevent lithium plating, lithium-ion batteries are charged at very low rate (C/10 or less) at low temperatures, which require an excessively long period of time to be fully charged.

One approach to solving this issue entails introducing electrical current into the battery cell for resistance heating of the battery cell. As one example, this can be accomplished by heating up the battery cell through controlled pulse charging and discharging of the battery. As another example, a sheet of metal foil is implemented inside a battery cell to generate joule heat that raises the battery temperature to a desired temperature for battery charging, as disclosed by Chao Y. Wang, et al (e.g. US Publication No. 20140285135; 20140295222; 20140342194; 20150104681; 20150303444; and 20160268646).

However, such an approach of internal joule heating or resistance heating has several major drawbacks. One major problem is the danger of overheating when the electric current is switched on, allowing a large amount of current to reach a location in an extremely short period of time, creating local hot spots that can significantly degrade or damage the various component materials (anode, cathode, separator, and electrolyte, etc.) of a cell. Under extreme conditions, the local heat may cause the liquid electrolyte to catch fire, leading to fire and explosion hazards. Another major issue is the requirement of implementing a complex electric circuit that controls both heating and battery charging; this battery management system must allow for constant temperature sensing and frequent switching between resistance-heating (e.g. through a metal foil) and electric charging of a battery cell.

Accordingly, a continuing need exists to reduce the charging time of a rechargeable battery without negatively impacting the battery. An urgent need exists for a battery that can be fast charged at all climate conditions and an effective method and system for fast charging a battery.

In addition to the long recharge time, overheating or thermal runaway of battery, leading to a battery catching fire or battery explosion, has been another serious barrier against the acceptance of battery-driven EVs. There has been no effective approach to overcoming this battery safety problem. An urgent need exists for a battery system that can be operated in a safe mode free from any thermal runaway problem.

An object of the present disclosure is to provide a fast-chargeable battery that can also operate in a safe mode with reduced or eliminated chance of overheating, a method of operating same, and a system and apparatus for achieving both functions of fast chargeability and cooling.

SUMMARY

It may be noted that the word "electrode" herein refers to either an anode (negative electrode) or a cathode (positive electrode) of a battery. These definitions are also commonly accepted in the art of batteries or electrochemistry. In battery industry, a module comprises a plurality of battery cells packaged together. A pack comprises a plurality of modules aggregated together. The presently invented battery charging system can be used to heat and charge one or a plurality of battery cells, regardless if or not they are packed into a module or pack or simply some individual battery cells. The term "battery" can refer to a battery cell or several battery cells connected together.

In some embodiments, this disclosure provides a battery charging system to enable fast charging of a battery (including one or multiple battery cells). The battery charging system comprises at least one charging circuit to charge at least one rechargeable battery cell and a heating device to provide heat that is transported through a heat spreader element (implemented outside the battery cell) to heat up the battery cell or cells to a desired temperature Tc before or during the fast charging operation of the battery cell(s). The battery charging system may further comprise cooling device to cool down a battery cell or multiple battery cells in a module or pack when the battery is discharged (e.g. when the cell(s) are operated to power an electronic device or EV motor). The heat generated inside a cell diffuses out to the heat spreader element, which transports the heat to the cooling device. The battery charging system can operate alternately between a heating mode (when or before the battery cells are recharged) and a cooling mode (when the cells are discharged).

In certain embodiments, a rechargeable battery cell comprises a protective housing and the heat spreader element is disposed outside the protective housing, but in thermal communication with the protective housing. The heat spreader element is configured to operate alternately between receiving heat from the heating device at a desired heating temperature $T_h$ to heat up the battery cell to the desired temperature Tc for battery cell charging and transferring heat from the battery cell to the cooling device when the battery cell is discharged to provide electric power to an external device or load In some preferred embodiments, the battery charging system comprises multiple charging stations to heat (and cool) and charge multiple rechargeable battery cells, wherein each charging station comprises one charging circuit, one heating device, and cooling device.

The battery charging system may further comprise a cooling device to cool the multiple rechargeable battery cells wherein the cooling device is in thermal communication with the heat spreader element configured to enable transporting internal heat of the battery cells through the heat spreader element to the cooling device when the battery cells are discharged, wherein the cooling device is not in thermal contact with the heat spreader element when the battery cell is heated by the heating device.

In certain embodiments, the heat spreader element contains a thermal film that receives electrical current from the charging circuit to generate heat inside the heat spreader element via resistance heating of the thermal film before or during battery charging. Selected thermal films, such as graphene film, flexible graphite film (foil), or artificial graphite film (pyrolytic graphite film), are capable of internally generating heat (via resistance heating or Joule heating) without any embedded electrical wires. These films per se act like electric wires or electric bands. Although unnecessary, additional electric wires may be embedded into these films if so desired.

The rechargeable battery cell preferably comprises an anode, a cathode, an electrolyte disposed between the anode and the cathode, a protective housing that at least partially encloses the anode, the cathode and the electrolyte, at least one heat-spreader element disposed entirely outside of the protective housing and configured to receive heat from an external heating device at a desired heating temperature $T_h$ to heat up the battery to a desired temperature Tc for battery charging. In some embodiments, the heat-spreader element does not receive an electrical current from an external circuit (e.g. battery charger) to generate heat for resistance heating. Tc is typically chosen to be from 30° C. to 90° C., more typically from 40° to 80° C., and most typically from 450 to 70° C.

A heating device may be heated by using laser heating, resistance heating, dielectric heating, thermal-electric heating, microwave heating, radio frequency heating, hot fluid heating (e.g. hot water, steam, silicone oil, etc. in a tubing), or a combination thereof.

The cooling device is preferably selected from a heat sink, a heat pipe, a vapor chamber, a stream of flowing fluid (when an EV is in motion, air may be directed to flow into contact with the heat spreader tabs, for instance), a thermoelectric device, a heat exchanger, a radiator, or a combination thereof.

Preferably, the heat-spreader element does not receive an electrical current from the charging circuit to generate heat inside the battery cell for internal resistance heating of the battery cell (not producing Joule heat in situ inside the cell).

In some embodiments, the rechargeable battery cell further comprises at least a temperature sensor for measuring an internal temperature of the battery. In some embodiments, the heat-spreader element acts as a temperature sensor for measuring an internal temperature of the battery. For instance, the graphene sheet exhibits a resistance that varies with the surrounding temperature and, as such, a simple resistance measurement may be used to indicate the local temperature where the graphene sheet is disposed.

In certain embodiments, the heat-spreader element comprises a high thermal conductivity material having a thermal conductivity no less than 100 W/mK. Preferably, the heat-spreader element comprises a material selected from graphene film (e.g. composed of graphene sheets aggregated together or bonded together into a film or sheet form), flexible graphite sheet, artificial graphite film (e.g. the films produced by carbonizing and graphitizing a polymer film, such as polyimide), foil or sheet of Ag, Ag, Cu, Al, brass, steel, Ti, Ni, Mg alloy, silicon nitride, boron nitride, aluminum nitride, boron arsenide, a composite thereof, or a combination thereof. The graphene film contains a graphene selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof.

The battery charging system may further comprise a thermal interface material (TIM) disposed between at least one of the battery cells and the heat spreader element. The thermal interface material comprises a material may be selected from graphene sheets, graphene foam, graphene-containing paste, graphite flake-containing paste, graphene-containing polymer composite, flexible graphite sheet, artificial graphite film, particles of graphite, Ag, Ag, Cu, Al, brass, steel, Ti, Ni, Mg alloy, silicon nitride, boron nitride, aluminum nitride, boron arsenide, a composite thereof, or a combination thereof.

In some preferred embodiments, the thermal interface material in the battery charging system comprises a graphene foam having a thermal conductivity from 0.1 W/mK to 100 W/mK and the heat spreader element comprises a graphene film or an artificial graphite film having a thermal conductivity from 600 W/mK to 1,800 W/mK.

Preferably, the heat spreader element is in a form of a film, sheet, layer, belt, or band having a thickness from about 100 nm to 10 mm, more preferably from 1 μm to 2 mm, and most preferably from 10μ to 1 mm.

In the battery charging system, the heating device preferably produces heat by using laser heating, resistance heating, dielectric heating, thermal-electric heating, microwave heating, radio frequency heating, hot fluid heating, or a combination thereof.

The cooling device is may be a heat sink, a heat pipe, a vapor chamber, a stream of flowing fluid, a bath of a coolant fluid, a thermoelectric device, a heat exchanger, a cooled plate, a radiator, or a combination thereof.

In certain embodiments, the heat spreader element is in a heat-spreading relation to an external surface of a battery cell and provides heat thereto before or during charging of the battery cell or receives heat therefrom when the battery cell is discharged to power an external device.

In certain embodiments, the heating device or the cooling device has a clipping device or connector device to reversibly grip or connect with the heat spreader element.

In the battery charging system, the heat spreader element is configured to controllably make thermal contact with the external heating device and get disconnected with the external heating device when a battery temperature reaches the desired temperature Tc.

The rechargeable battery may be a lithium-ion battery, lithium metal secondary battery, lithium-sulfur battery, lithium-air battery, lithium-selenium battery, sodium-ion battery, sodium metal secondary battery, sodium-sulfur battery, sodium-air battery, magnesium-ion battery, magnesium metal battery, aluminum-ion battery, aluminum metal secondary battery, zinc-ion battery, zinc metal battery, zinc-air battery, nickel metal hydride battery, lead acid battery, lead acid-carbon battery, lead acid-based ultra-battery, lithium-ion capacitor, or supercapacitor.

The present disclosure also provides a battery module or pack that comprises a plurality of battery cells in charging/discharging relation to the battery charging system described above, with a heating device alone or with a heating device and a cooling device.

The present disclosure also provides a method of operating a battery charging system comprising multiple charging stations, the method comprising: (a) positioning multiple rechargeable battery cells in the respective multiple charging stations; (b) operating at least a heating device of the battery charging system to provide heat that is transported through a heat spreader element (implemented outside each of said battery cells) to heat up the battery cells to a desired temperature Tc; and (c) activating at least one charging circuit from the battery charging system to charge the battery cells at or near Tc until the battery cells reach a desired degree of charge (DOC).

In the invented method, the heat-spreader element preferably comprises a high thermal conductivity material having a thermal conductivity no less than 100 W/mK and wherein a time for heating the battery to temperature Tc is no greater than 5 minutes.

In some preferred embodiments, the heat-spreader element comprises a material selected from graphene film, flexible graphite sheet, artificial graphite film, Ag, Ag, Cu, Al, brass, steel, Ti, Ni, Mg alloy sheet, silicon nitride, boron nitride, aluminum nitride, boron arsenide, a composite thereof, or a combination thereof. The graphene film preferably contains a graphene selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof.

In certain embodiments, the method further comprise a step (d) of stopping battery cell charging and bringing the heat spreader element to make thermal contact with a cooling device.

In some embodiments, the heat spreader element comprises a high thermal conductivity material having a thermal conductivity no less than 100 W/mK and wherein the time for heating the battery cells to temperature Tc is no greater than 15 minutes. Preferably, the heat spreader element comprises a material selected from graphene film, flexible graphite sheet, artificial graphite film, Ag, Ag, Cu, Al, brass, steel, Ti, Ni, Mg alloy sheet, silicon nitride, boron nitride, aluminum nitride, boron arsenide, a composite thereof, or a combination thereof.

In the disclosed method, the graphene film preferably contains a graphene selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof.

In some embodiments, step (b) comprises controllably making the heat spreader element in thermal contact with the external heating device and disconnecting the heat spreader element from the external heating device when a battery cell temperature reaches the desired temperature Tc.

In some embodiments, step (d) comprises controllably making heat spreader element in thermal contact with the cooling device when the battery cell is discharged.

In some embodiments, step (b) comprises bringing an external surface of a battery cell in thermal communication with the external heating device for battery charging; or wherein step (d) comprises bringing an external surface of a battery cell in thermal communication with the cooling device when the battery cell is discharged.

In some embodiments, the heating device provides heat by using laser heating, resistance heating, dielectric heating, thermal-electric heating, microwave heating, radio frequency heating, hot fluid heating (e.g. hot water, steam, silicone oil, etc. in a tubing), or a combination thereof.

DETAILED DESCRIPTION OF PREFERRED EMBODIMENTS

Figure 1A:
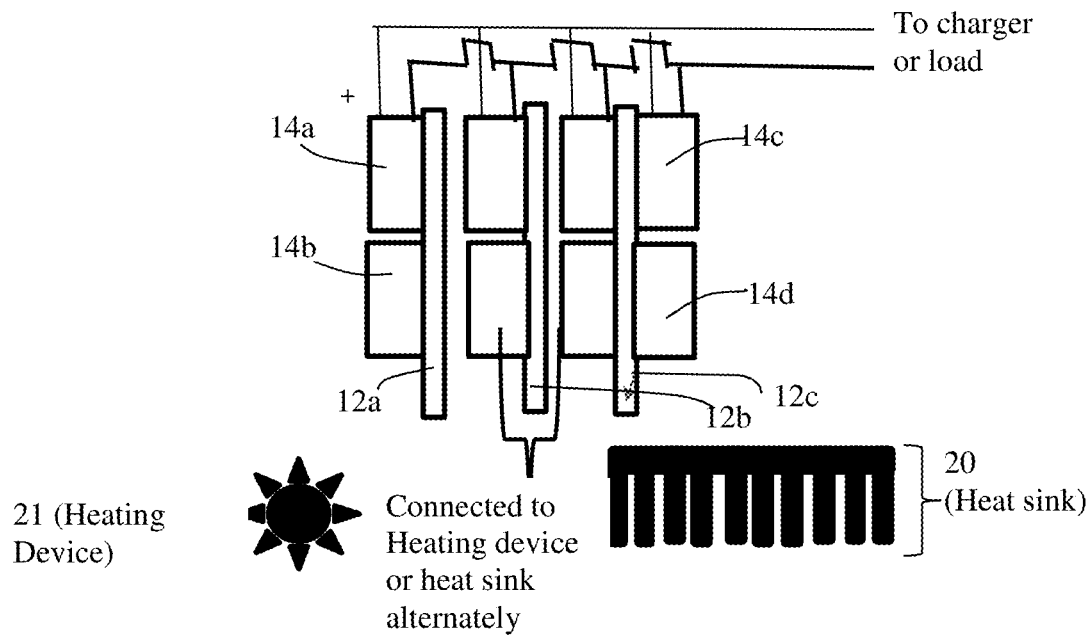
FIG. 1(A) Schematic of a battery charging/heating/cooling system according to an embodiment of the present disclosure; multiple battery cells may be thermally attached to one primary surface or two primary surfaces of a graphitic heat spreader element (e.g. a graphitic film).

The present discussion of preferred embodiments makes use of lithium-ion battery as an example. The present disclosure is applicable to a wide array of rechargeable batteries, not limited to the lithium-ion batteries. Examples of the rechargeable batteries include the lithium-ion battery, lithium metal secondary battery, lithium-sulfur battery, lithium-air battery, lithium-selenium battery, sodium-ion battery, sodium metal secondary battery, sodium-sulfur battery, sodium-air battery, magnesium-ion battery, magnesium metal battery, aluminum-ion battery, aluminum metal secondary battery, zinc-ion battery, zinc metal battery, zinc-air battery, nickel metal hydride battery, lead acid battery, lead acid-carbon battery, lead acid-based ultra-battery, lithium-ion capacitor, or supercapacitor As indicated in the Background section of instant specification, lithium plating on the anode material is a major obstacle to fast chargeability of a lithium-ion battery. A major symptom of lithium plating is a drastic capacity loss. Lithium plating can also pose safety hazards. Recent data available in battery industry has demonstrated that cycle life of LiBs drops considerably with temperature. Typically, an exponential drop of cycle life with decreasing temperature is observed, following the Arrhenius law. For instance, even at a cool temperature of 10° C., cell life is only about half of that at 25° C. Thus, even at fast charging stations, consumers are not able to quickly recharge their EVs at low ambient temperatures. Compared to traditional gasoline-powered vehicles whose fuel tank can be filled up in less than five minutes under all climate conditions, EV requires hours to get a full recharge in cold weather. Fast charging is essential to enabling public charge stations and battery-powered electric vehicles.

To avoid the danger of damaging the battery due to battery charging at low ambient temperatures and to reduce the charging time, we propose to heat the rechargeable batteries to a near room-temperature range or higher suitable for fast charging. A conventional approach to heating a battery cell entails introducing electric current into the battery for internal resistance heating of the battery. Such an approach runs the danger of overheating the battery in that, when a large amount of current reaches an internal battery location in an extremely short period of time, the resulting local hot spots can significantly degrade or damage the various component materials. Instant disclosure provides an effective solution to this problem. Further, presumably one can heat the battery externally by using convective air/liquid heating or thermal jackets. However, such a process suffers from long heating time and significant heat loss to the surroundings.

In some embodiments, this disclosure provides a battery charging system to enable fast charging of a battery. The battery charging system comprises at least one charging circuit to charge at least one rechargeable battery cell and a heating device to provide heat that is transported through a heat spreader element (implemented fully outside the at least one battery cell) to rapidly heat up the battery cell to a desired temperature Tc before or during conducting a fast charging operation of the battery cell. The heat spreader element comprises a graphene film (having a thermal conductivity typically from 800 to 1,800 W/mK), artificial graphite film or foil ((thermal conductivity typically from 600 to 1,750 W/mK)), or a flexible graphite sheet or foil (thermal conductivity typically from 200 to 500 W/mK). These high thermal conductivity materials enable fast transport of heat from a heating device, through the heat spreader element, to reach a battery cell surface.

In certain embodiments, the battery charging system also has a provision to cool the battery cells when the battery is discharged (e.g. when the battery is operated to power a load or external device). These high thermal conductivity materials also enable fast transport of heat from a battery cell surface, through the heat spreader element, to reach a cooling device for rapid heat dissipation when the battery cells are discharged.

Thus, the present disclosure also provides a battery charging system comprising (a) at least one charging circuit to charge at least one rechargeable battery cell; (b) at least a heating device to provide heat that is transported through a heat spreader element (implemented outside the battery cell, but in thermal contact therewith) to heat up the battery cell to a desired temperature Tc before or during charging of the battery cell; and (c) a cooling device in thermal contact with the heat spreader element configured to enable transporting of internal heat of the battery cell through the heat spreader element to the cooling device when the battery cell is discharged, wherein the cooling device is not in thermal contact with the heat spreader element when the battery cell is heated by the heating device.

In some embodiments, the rechargeable battery cell comprises an anode, a cathode, an electrolyte disposed between the anode and the cathode, and a protective housing that at least partially encloses the anode, the cathode and the electrolyte, wherein the heat-spreader element is disposed partially or entirely outside the protective housing and configured to operate alternately between receiving heat from the heating device at a desired heating temperature $T_h$ to heat up the battery cell to the desired temperature Tc for battery cell charging and transferring heat from the battery cell to the cooling device when the battery cell is discharged or is operated to provide electric power to an external device or load. Optionally, the heat spreader element receives an electrical current from an external circuit (e.g. battery charger) to generate heat for resistance heating.

As illustrated in FIG. 1(A), according to some embodiments of the disclosure, the battery charging system comprises (a) at least one charging circuit to charge at least one rechargeable battery cell; and (b) at least a heating device to provide heat that is transported through a heat spreader element to the battery cells during battery charging. The battery cells are in thermal or physical contact with the heat spreader, which is in thermal communication with either an external heating device (e.g. a heating element or Peltier junction heater, 21) before or during charging of the cell or, alternately, a cooling device (e.g. a heat sink 20, vapor chamber, or cooled plate) during cell discharging.

When the battery cells are in the cooling mode (or during battery discharge), the battery cooling system comprises (a) a graphitic heat spreader element (preferably in the form of a graphene or graphitic film, sheet, layer, belt, band, etc.) configured to be in thermal communication with the battery cells (e.g. to abut or contact at least one of the battery cells or in contact with a thermal interface material which is, in turn, in thermal contact with at least one of the battery cells); and (b) a cooling device in thermal communication with the graphitic heat spreader element and configured to transport heat generated by the battery cell(s) through the heat spreader element into a cooling device. When the heat spreader element is made to be in thermal contact with a heating device, the system becomes essentially a heating system for the battery cells to get them ready for recharge.

Figure 6A:
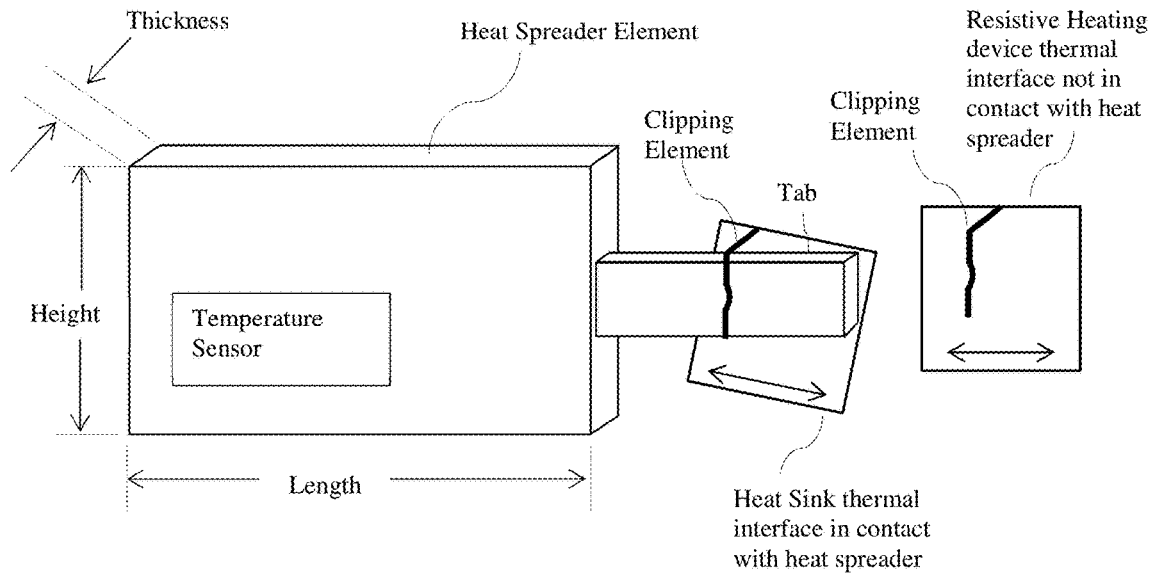
FIG. 6(A) Schematic drawing illustrating an embodiment of a cooling condition in which a cooling device is in thermal contact with the heat spreader element FIG. 6(B) Schematic drawing illustrating an embodiment of a heating condition in which a heating device is in thermal contact with the heat spreader element
Figure 6B:
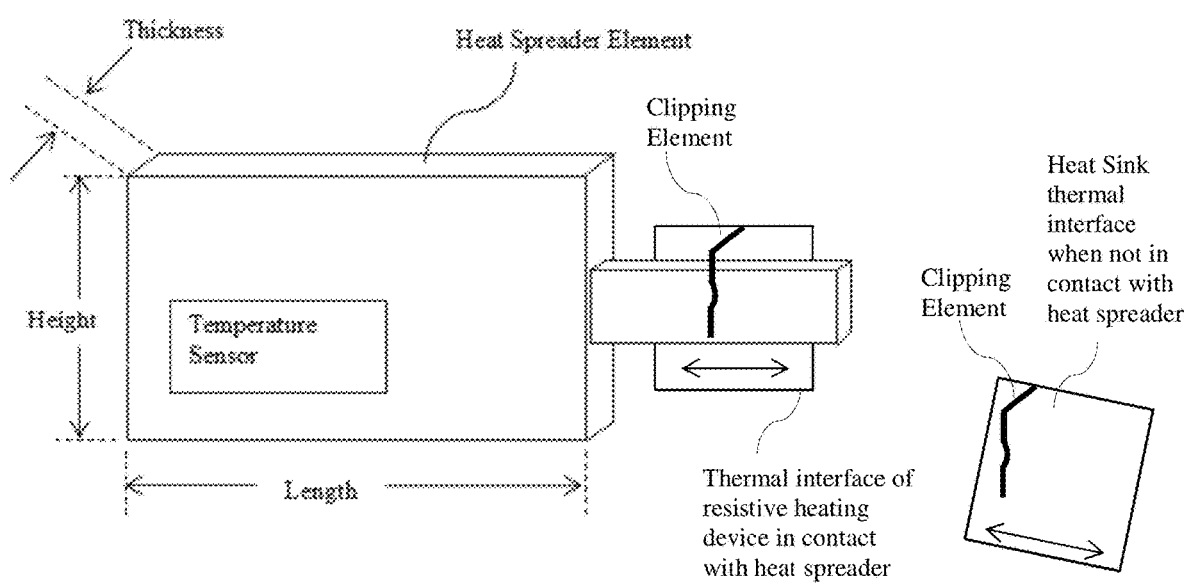

FIG. 6(A) and FIG. 6(B) show one possible embodiment. FIG. 6(A) show a cooling condition where the thermal interface of a cooling device, in this case a heat sink (not shown), is in thermal contact with the heat spreader element. In the cooling condition of FIG. 6(A) the heating device interface, in this embodiment a resistive heating device (not shown), is not in thermal contact with the heat spreader element. FIG. 6(B) shows the heating condition for the embodiment shown in a cooling condition in FIG. 6(A). In the heating condition, the thermal interface of the heating device is in thermal contact with the heat spreader element while the thermal interface for the cooling device is not in thermal contact. FIG. 6(A) and FIG. 6(B) show clipping a tab of the thermal heat spreader to the thermal interface of either the heating or cooling device as a non-limiting embodiment.

Due to the high thermal conductivity of the graphitic film or graphene film, such implementation of a graphene or graphitic heat spreader member can rapidly transport the heat out of the battery cells, reducing or eliminating the need to have complex, bulky or heavy cooling apparatus. The disclosed cooling system per se can be a passive cooling system or part of an active cooling system.

As illustrated in FIG. 1(A), according to some embodiments of the disclosure, the battery cells (e.g. 14*a*, 14*b*, 14*c*, 14*d*) are in thermal or physical contact with a graphitic or graphene heat spreader element (e.g. containing graphitic films 12*a*, 12*b*, or 12*c*), which is, in turn, in thermal or physical contact with a cooling device (e.g. a heat sink 20, vapor chamber, or cooled plate). The heat generated by a battery cell during cell discharging is transferred to a graphitic thermal film which rapidly spreads the heat over to a cooling device (e.g. a finned heat sink 20 in FIG. 1(A)). The heat spreading rate in the heat spreader element can be exceptionally high due to the high thermal conductivity of graphitic or graphene films. When the battery cells are to be charged, particularly in a cold climate, the heat spreader is made to be in thermal communication with a heating device, 21.

Figure 1B:
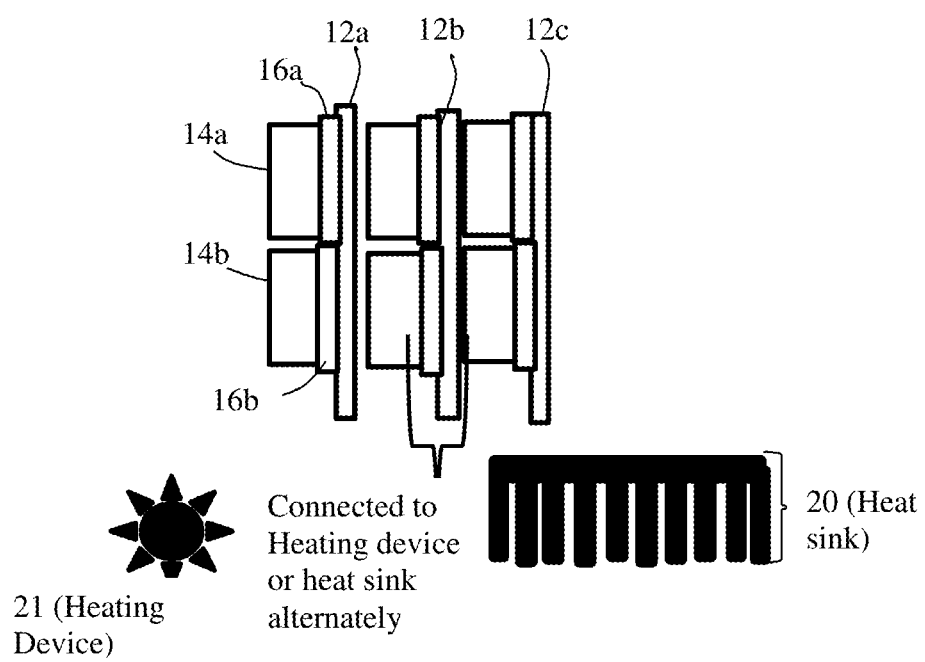
FIG. 1(B) Schematic of a battery charging/heating/cooling system according to another embodiment of the present disclosure; a thermal interface material provides intimate thermal contact between a battery cell and a graphitic heat spreader element, which is, in turn, thermally connected to a heat sink.

The alternate heating/cooling system may preferably further comprise a thermal interface material (TIM) coupled to at least one of the battery cells and the heat spreader element. As illustrated in FIG. 1(B), a TIM (e.g. 16*a* or 16*b*) is implemented between a battery cell (e.g. 14*a* or 14*b*) and a heat spreader element (e.g. 12*a*). The presence of a TIM enables a good thermal contact between a heat spreader element and a battery cell (a heating device).

Figure 1C:
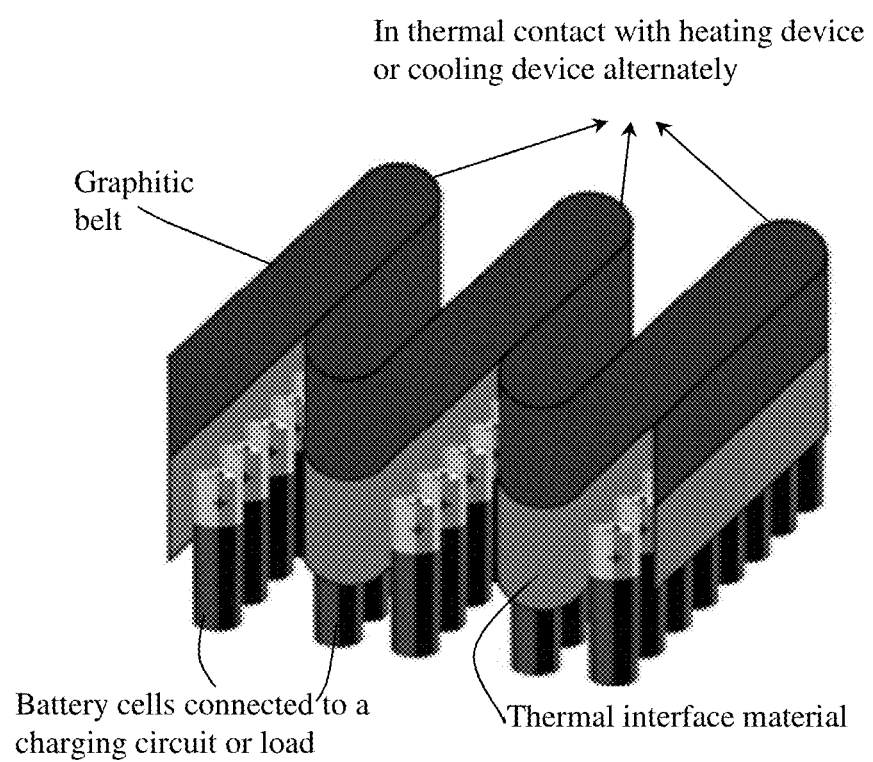
FIG. 1(C) Schematic of a disclosed battery charging/heating/cooling system that comprises a continuous graphitic belt (a graphitic heat spreader element or member) in thermal contact with multiple battery cells through a thin layer of a thermal interface material. The graphitic heat spreader element is in thermal communication with a cooling device (not shown).

Illustrated in FIG. 1(C) is portion of a disclosed battery charging/heating/cooling system that comprises a continuous graphitic belt (a graphitic heat spreader element or member). The continuous graphitic belt runs through the gaps between rows (or modules) of battery cells. An optional thermal interface material (e.g. a graphene- or expanded graphite-reinforced rubber matrix composite or graphene foam) is disposed between the battery cells and the graphitic heat spreader element. During the battery discharge (cooling mode), heat generated from battery cells is transported through the thermal interface material into the graphitic heat spreader element. Due to the exceptionally high thermal conductivity of the graphitic material, heat can rapidly spread from the battery cell contact points to a far end or other portion of the heat spreader element where the heat spreader is in thermal communication with a cooling device (e.g. a liquid coolant bath, a stream of flowing air, a heat pipe, a finned heat sink, a radiator, etc.). Heat is then rapidly dissipated or removed by the cooling device. Alternately, during the battery charge (the heating mode), the heat spreader element is made to be in thermal contact with a heating device.

Again, the heating device may be heated by using laser heating, resistance heating, dielectric heating, thermal-electric heating, microwave heating, radio frequency heating, hot fluid heating (e.g. hot water, steam, silicone oil, etc. in a tubing), or a combination thereof.

Figure 1D:
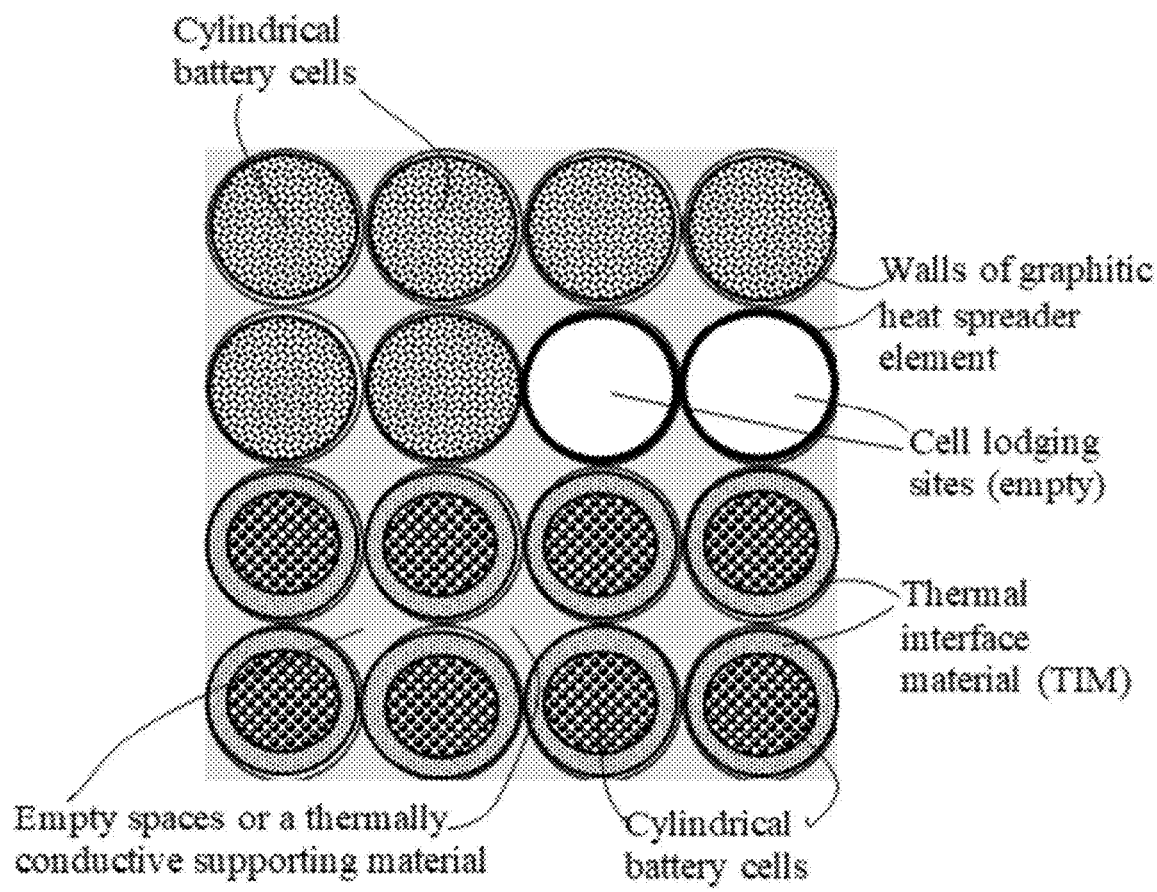
FIG. 1(D) Schematic of a battery charging/heating/cooling system, according to an embodiment of the present disclosure. The cooling system comprises multiple cylindrical pores having pore walls composed of graphitic thermal films or expanded graphite composites as a graphitic heat spreader element.
Figure 1E:
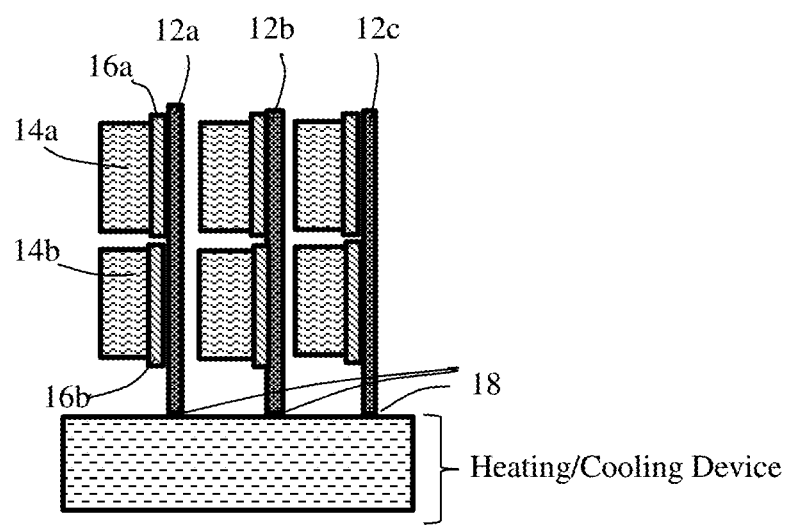
FIG. 1(E) Schematic of a battery charging/heating/cooling system according to another embodiment of the present disclosure; a thermal interface material provides intimate thermal contact between a battery cell and a graphitic heat spreader element, which is, in turn, thermally connected to a heating device or cooling device.

Schematically shown in FIG. 1(D) is a battery charging/heating/cooling system, according to an embodiment of the present disclosure. The battery pack equipped with such a cooling system may be disposed in the chassis of an electric vehicle. In certain embodiments, the cooling system comprises multiple cylindrical pores having pore walls constituted by graphitic or graphene thermal films (heat spreader element). Cylindrical battery cells may be directly fit into the pores (the cell-lodging sites), as illustrated in the upper two rows of FIG. 1(D). There can be a cylindrical shell of a TIM disposed between the graphitic or graphene heat spreader element wall and a cylindrical battery cell, as illustrated in the lower two rows of FIG. 1(D). It may be noted that the cell-lodging pores do not have to be cylindrical in shape and can be of any shape conformal to the actual battery cell shape. The heat spreader element is in thermal communication with a cooling device (not shown) or, alternatively, a heating device (not shown).

For instance, the opposite ends of heat spreader element may be connected to a heat sink (e.g. attached to a finned heat sink, being immersed in a coolant bath, subjected to a stream of blowing air, etc.). When the battery cells in the pack are discharged to drive the EV, the cooling system keeps the battery lower than a safe temperature.

Illustrated in FIG. 1 (E) the thermal interface portion 18 of the heating/cooling device is in thermal contact with the heat spreader element 12*b*. The graphitic heat spreader element is in thermal communication with a heating/cooling device. For instance, the opposite ends of heat spreader element may be connected to a heat sink (e.g. attached to a finned heat sink, being immersed in a coolant bath, subjected to a stream of blowing air, etc.). When the battery cells in the pack are discharged to drive the EV, the cooling system keeps the battery lower than a safe temperature. The heat spreader element may be connected to a heating device (e.g. attached to a resistive heating device).

There is no limitation on the type of cooling device that can be implemented to cool down the battery cells when working to power an electronic device or an EV. The cooling device may be selected from a heat sink, a heat pipe, a vapor chamber, a stream of flowing fluid, a thermoelectric device, a cooled/refrigerated plate, a heat exchanger, a radiator, or a combination thereof.

Figure 2:
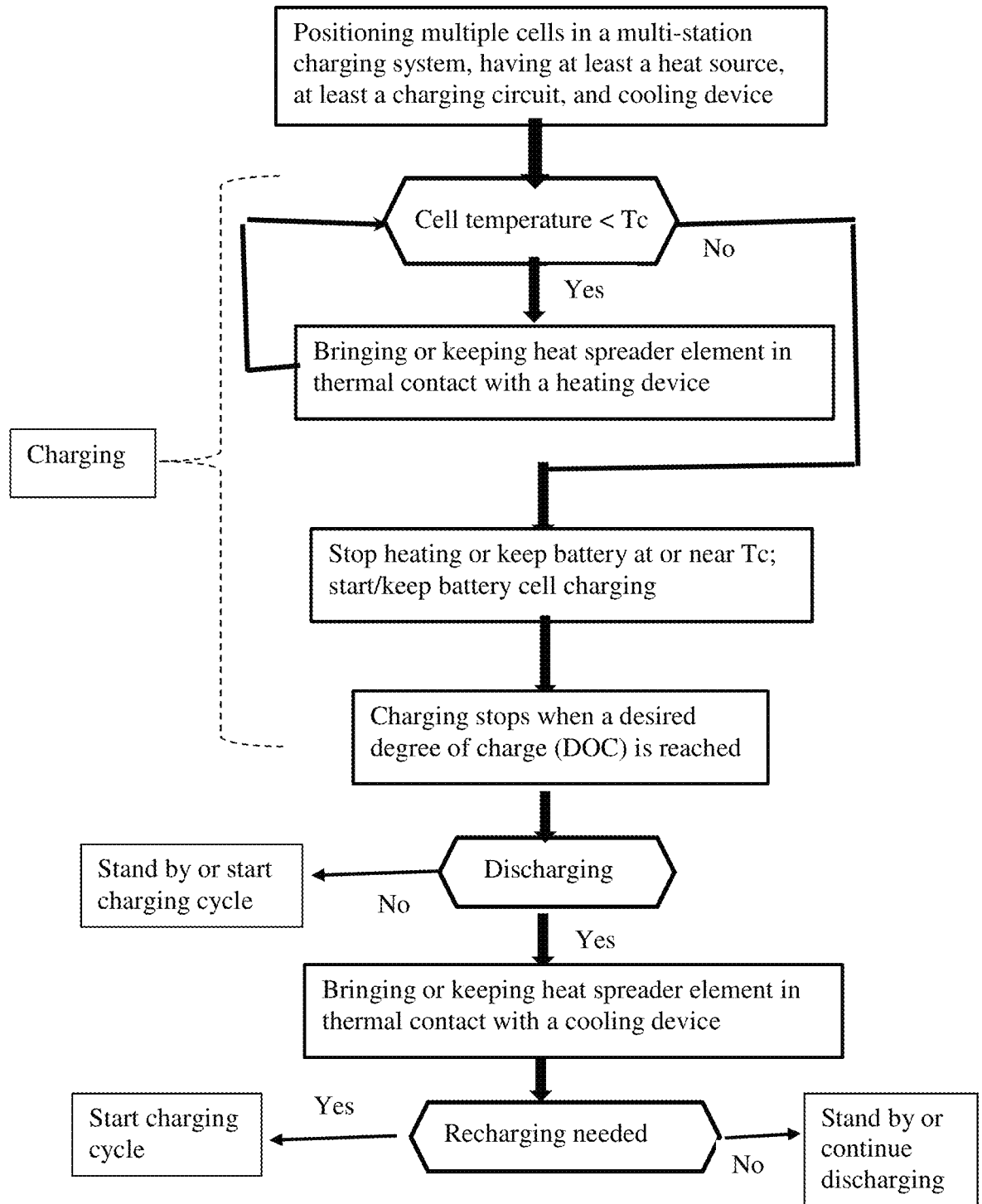
FIG. 2 A flow chart showing the method of operating the presently invented battery charging and cooling system according to an embodiment of present disclosure.

The present disclosure also provides a method of operating a battery charging system comprising multiple charging stations. As illustrated in FIG. 2, in certain embodiments, the method comprises: (a) positioning multiple rechargeable battery cells in the respective multiple charging stations; (b) operating at least a heating device of the battery charging system to provide heat that is transported through a heat spreader element (implemented outside each of said battery cells) to heat up the battery cells to a desired temperature Tc; and (c) activating at least one charging circuit from the battery charging system to charge the battery cells at or near Tc until the battery cells reach a desired degree of charge (DOC).

Step (b) comprises controllably making the heat spreader element in thermal contact with the external heating device and disconnecting the heat spreader element from the external heating device when a battery cell temperature reaches the desired temperature Tc.

In some embodiments, step (d) comprises controllably making heat spreader element in thermal contact with the cooling device when the battery cell is discharged.

In some embodiments, step (b) comprises bringing an external surface of a battery cell in thermal communication with the external heating device for battery charging; or wherein step (d) comprises bringing an external surface of a battery cell in thermal communication with the cooling device when the battery cell is discharged.

Figure 3:
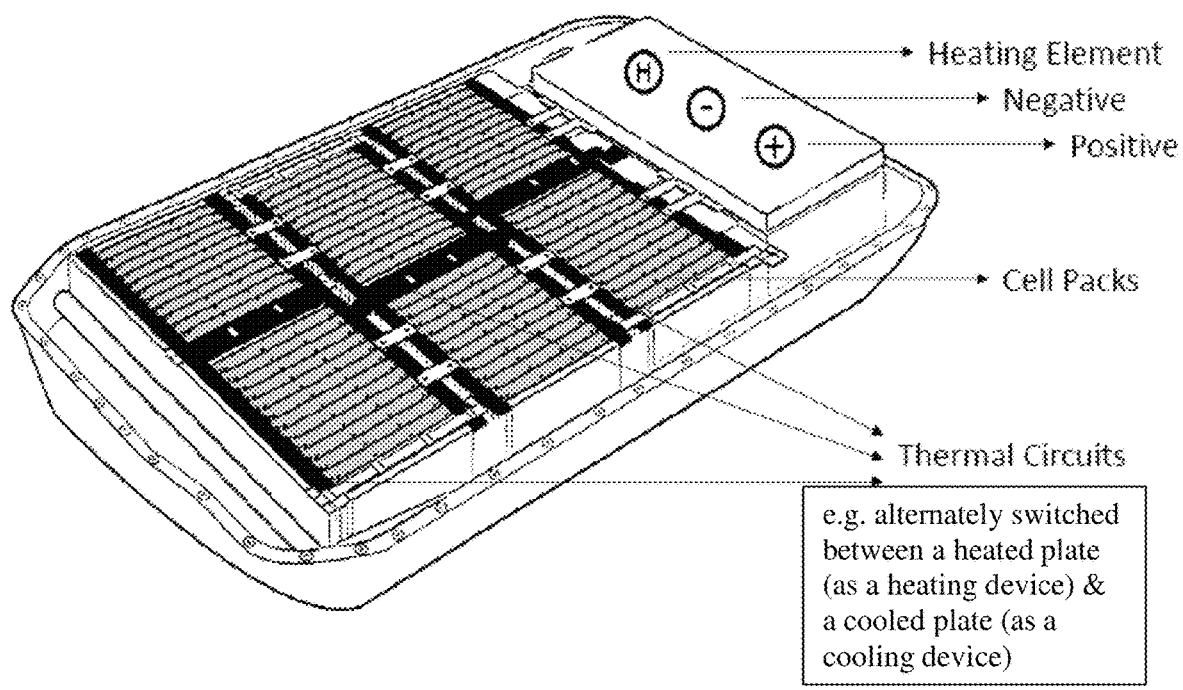
FIG. 3 Schematic of a battery pack charging and cooling system, according to an embodiment of the present disclosure. This battery pack may be disposed in the chassis of an electric vehicle.

Schematically shown in FIG. 3 is a battery pack charging/cooling/heating system, according to an embodiment of the present disclosure. This battery pack may be disposed in the chassis of an electric vehicle. In additional to a battery charging circuit that can recharge all the battery cells in this pack, there are thermal circuits that provide heat to enter the cells through their respective heat spreader elements. These thermal circuits may include electrical circuits that send electric power to heating devices near individual battery cells. These thermal circuits may be simply some heated members that are strategically positioned with respect to individual battery cells to readily transfer heat through the heat spreader tabs or cell caps into the cells. When the battery cells in the pack are discharged to drive the EV, the thermal circuits may be cooled by the cooling device to keep the battery cooler and at a safe temperature.

There is no limitation on the type and nature of the external heating device provided that this heating device per se is capable of providing heat to the heat spreader element without sending an electrical current through this element into the battery cell for internal joule heating of the battery cell. For instance, the external heating device may be as simple as a metal plate or a metal clip that is already at a desired heating temperature $T_h$ prior to being brought to contact the element. Such an arrangement of having a ready-to-heat heating device, in conjunction with a heat spreader element of high thermal conductivity, will significantly reduce the time to bring a battery cell to a desired temperature for fast charging.

Alternatively, the external heating device may be rapidly heated to reach $T_h$ as soon as the heat spreader element is brought in contact with the external heating device. This heating device may be heated by using any known heating mechanism; e.g. laser heating, resistance heating, dielectric heating, thermal-electric heating (e.g. Peltier junction heating), microwave heating, radio frequency (RF) heating, etc. Any of these heating mechanisms may be used to directly heat the external tab of the heat spreader element provided it does not send a current into the battery. One or a plurality of external heating devices may be used to provide heat to one or a plurality of heat spreader elements of one or a plurality of batteries concurrently or sequentially.

There is also no limitation on the type of cooling device that can be implemented to cool down the battery cells when working to power an electronic device or an EV. The cooling device may be selected from a heat sink, a heat pipe, a vapor chamber, a stream of flowing fluid, a thermoelectric device, a heat exchanger, a radiator, or a combination thereof.

It is important that the heat spreader element has a high thermal conductivity to allow for rapid transfer of a large amount of heat from the external heating device through the heat spreader element to the interior of the battery to be recharged. Such a heat spreader element also enables fast heat transfer from the interior of a battery cell to the cooling device (external to the battery cell) when the cell is discharged. Preferably, for fast charging of the battery cell, such a high thermal conductivity and the cross-sectional area of the heat spreader element are sufficiently high to ensure the battery reaching a desired temperature in less than 15 minutes (preferably less than 10 minutes, further preferably less than 5 minutes, most preferably less than 2 minutes) to enable fast charging. After charging begins, preferably charging is completed in 15 minutes (4 C rate), preferably in 10 minutes (6 C rate), further preferably in 5 minutes (12 C rate), and most preferably in 2 minutes (30 C rate). The battery charging C rate is defined as follows: a nC rate means completion of charging in 60/n minutes or 1/n hour; a 3 C rate means completing the charging in 60/3=20 minutes and a C/3 rate means completing charging in 3 hours.

In certain embodiments, the heat spreader element comprises a high thermal conductivity material having a thermal conductivity no less than 200 W/mK, more preferably greater than 400 W/mK, and most preferably from 800 to 1,800 W/mK. Preferably, the heat-spreader element comprises a material selected from graphene film (e.g. composed of graphene sheets aggregated together or bonded together into a film or sheet form), flexible graphite sheet, artificial graphite film (e.g. the films produced by carbonizing and graphitizing a polymer film, such as polyimide), foil or sheet of Ag, Ag, Cu, Al, brass, steel, Ti, Ni, Mg alloy, silicon nitride, boron nitride, aluminum nitride, boron arsenide, a composite thereof, or a combination thereof.

The graphene film contains a graphene selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof. The graphene film typically exhibits a thermal conductivity from 800 to 1,800 W/mK. Flexible graphite sheet typically exhibits a thermal conductivity from 150 to 500 W/mK. Artificial graphite films (e.g. those produced by carbonizing and graphitizing a polymer film) can exhibit a thermal conductivity from 600 to 1,750 W/mK. Graphene films, flexible graphite sheets, and artificial graphite films are commonly regarded as three distinct classes of materials.

Carbon materials can assume an essentially amorphous structure (glassy carbon), a highly organized crystal (graphite), or a whole range of intermediate structures that are characterized in that various proportions and sizes of graphite crystallites and defects are dispersed in an amorphous matrix. Typically, a graphite crystallite is composed of a number of graphene sheets or basal planes that are bonded together through van der Waals forces in the c-axis direction, the direction perpendicular to the basal plane. These graphite crystallites are typically micron- or nanometer-sized. The graphite crystallites are dispersed in or connected by crystal defects or an amorphous phase in a graphite particle, which can be a graphite flake, carbon/graphite fiber segment, carbon/graphite whisker, or carbon/graphite nano-fiber. In other words, graphene planes (hexagonal lattice structure of carbon atoms) constitute a significant portion of a graphite particle.

A single-layer graphene sheet is composed of carbon atoms occupying a two-dimensional hexagonal lattice. Multi-layer graphene is a platelet composed of more than one graphene plane. Individual single-layer graphene sheets and multi-layer graphene platelets are herein collectively called nano graphene platelets (NGPs) or graphene materials. NGPs include pristine graphene (essentially 99% of carbon atoms), slightly oxidized graphene (<5% by weight of oxygen), graphene oxide (≥5% by weight of oxygen), slightly fluorinated graphene (<5% by weight of fluorine), graphene fluoride ((≥5% by weight of fluorine), other halogenated graphene, and chemically functionalized graphene.

Our research group was among the first to discover graphene [B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. The processes for producing NGPs and NGP nanocomposites were recently reviewed by us [Bor Z. Jang and A Zhamu, "Processing of Nano Graphene Platelets (NGPs) and NGP Nanocomposites: A Review," J. Materials Sci. 43 (2008) 5092-5101]. The production of various types of graphene sheets is well-known in the art.

For instance, the chemical processes for producing graphene sheets or platelets typically involve immersing powder of graphite or other graphitic material in a mixture of concentrated sulfuric acid, nitric acid, and an oxidizer, such as potassium permanganate or sodium perchlorate, forming a reacting mass that requires typically 5-120 hours to complete the chemical intercalation/oxidation reaction. Once the reaction is completed, the slurry is subjected to repeated steps of rinsing and washing with water. The purified product is commonly referred to as graphite intercalation compound (GIC) or graphite oxide (GO). The suspension containing GIC or GO in water may be subjected to ultrasonication to produce isolated/separated graphene oxide sheets dispersed in water. The resulting products are typically highly oxidized graphene (i.e. graphene oxide with a high oxygen content), which must be chemically or thermal reduced to obtain reduced graphene oxide (RGO).

Alternatively, the GIC suspension may be subjected to drying treatments to remove water. The dried powder is then subjected to a thermal shock treatment. This can be accomplished by placing GIC in a furnace pre-set at a temperature of typically 800-1100° C. (more typically 950-1050° C.) to produce exfoliated graphite (or graphite worms), which may be subjected to a high shear or ultrasonication treatment to produce isolated graphene sheets.

Alternatively, graphite worms may be re-compressed into a film form to obtain a flexible graphite sheet. Flexible graphite sheets are commercially available from many sources worldwide.

The starting graphitic material may be selected from natural graphite, synthetic graphite, highly oriented pyrolytic graphite, graphite fiber, graphitic nano-fiber, graphite fluoride, chemically modified graphite, meso-carbon microbead, partially crystalline graphite, or a combination thereof.

Pristine graphene sheets may be produced by the well-known liquid phase exfoliation or metal-catalyzed chemical vapor deposition (CVD).

Graphene films, flexible graphite sheets, and artificial graphite films are commonly regarded as three fundamentally different and patently distinct classes of materials.

Figure 4A:
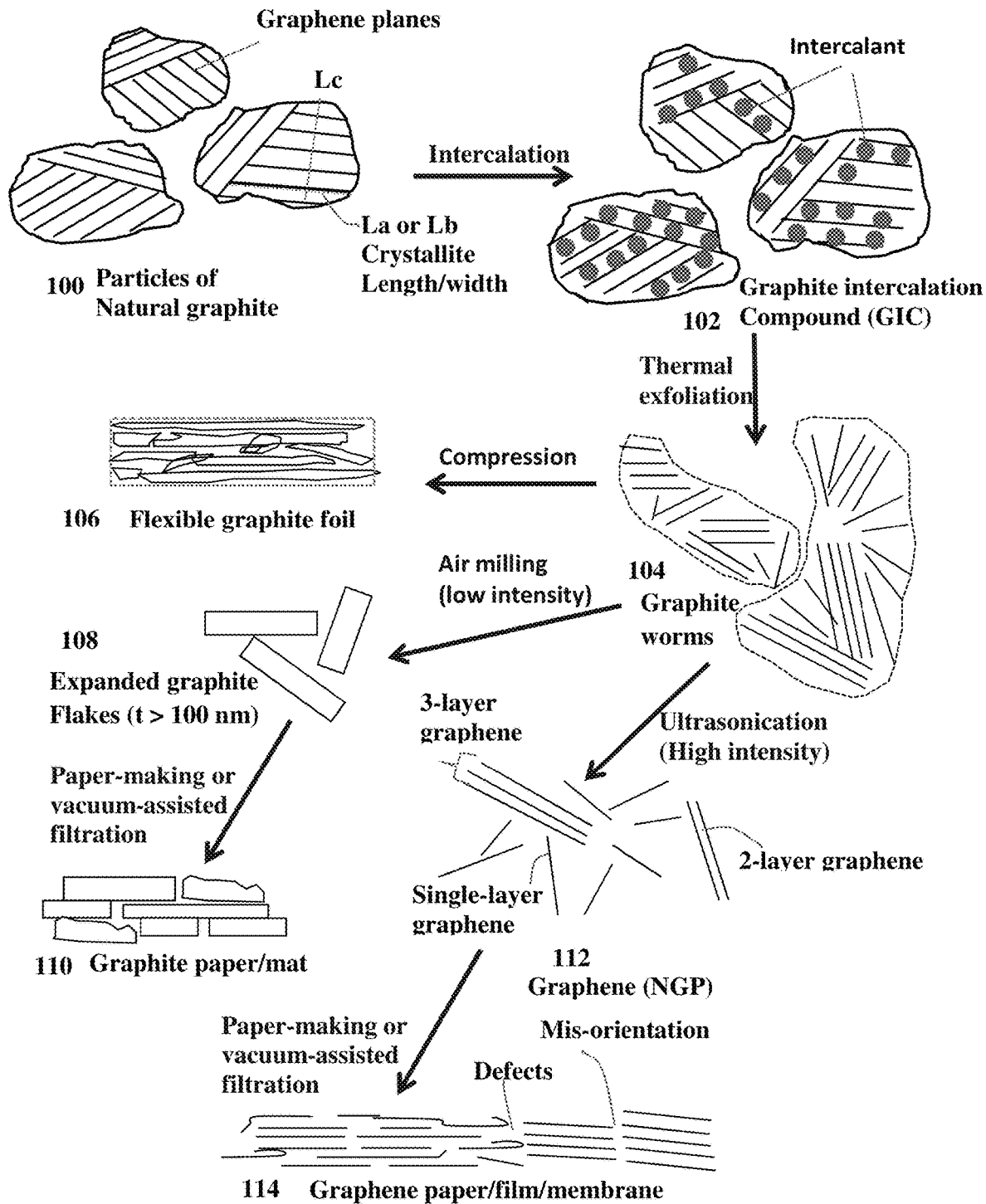
FIG. 4(A) Schematic drawing illustrating the processes for producing intercalated and/or oxidized graphite, subsequently exfoliated graphite worms, and conventional paper, mat, film, and membrane of simply aggregated graphite or graphene flakes/platelets.

As schematically illustrated in the upper portion of FIG. 4(A), bulk natural graphite is a 3-D graphitic material with each graphite particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane or hexagonal carbon atom plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). The inter-graphene plane spacing in a natural graphite material is approximately 0.3354 nm.

Artificial graphite materials also contain constituent graphene planes, but they have an inter-graphene planar spacing, $d_{002}$, typically from 0.32 nm to 0.36 nm (more typically from 0.3339 to 0.3465 nm), as measured by X-ray diffraction. Many carbon or quasi-graphite materials also contain graphite crystals (also referred to as graphite crystallites, domains, or crystal grains) that are each composed of stacked graphene planes. These include meso-carbon microbeads (MCMBs), meso-phase carbon, soft carbon, hard carbon, coke (e.g. needle coke), carbon or graphite fibers (including vapor-grown carbon nano-fibers or graphite nano-fibers), and multi-walled carbon nanotubes (MW-CNT). The spacing between two graphene rings or walls in a MW-CNT is approximately 0.27 to 0.42 nm. The most common spacing values in MW-CNTs are in the range from 0.32-0.35 nm, which do not strongly depend on the synthesis method.

It may be noted that the "soft carbon" refers to a carbon material containing graphite domains wherein the orientation of the hexagonal carbon planes (or graphene planes) in one domain and the orientation in neighboring graphite domains are not too mis-matched from each other so that these domains can be readily merged together when heated to a temperature above 2,000° C. (more typically above 2,500° C.). Such a heat treatment is commonly referred to as graphitization. Thus, the soft carbon can be defined as a carbonaceous material that can be graphitized. In contrast, a "hard carbon" can be defined as a carbonaceous material that contain highly mis-oriented graphite domains that cannot be thermally merged together to obtain larger domains; i.e. the hard carbon cannot be graphitized.

The spacing between constituent graphene planes of a graphite crystallite in a natural graphite, artificial graphite, and other graphitic carbon materials in the above list can be expanded (i.e. the $d_{002}$ spacing being increased from the original range of 0.27-0.42 nm to the range of 0.42-2.0 nm) using several expansion treatment approaches, including oxidation, fluorination, chlorination, bromination, iodization, nitrogenation, intercalation, combined oxidation-intercalation, combined fluorination-intercalation, combined chlorination-intercalation, combined bromination-intercalation, combined iodization-intercalation, or combined nitrogenation-intercalation of the graphite or carbon material.

Figure 4B:
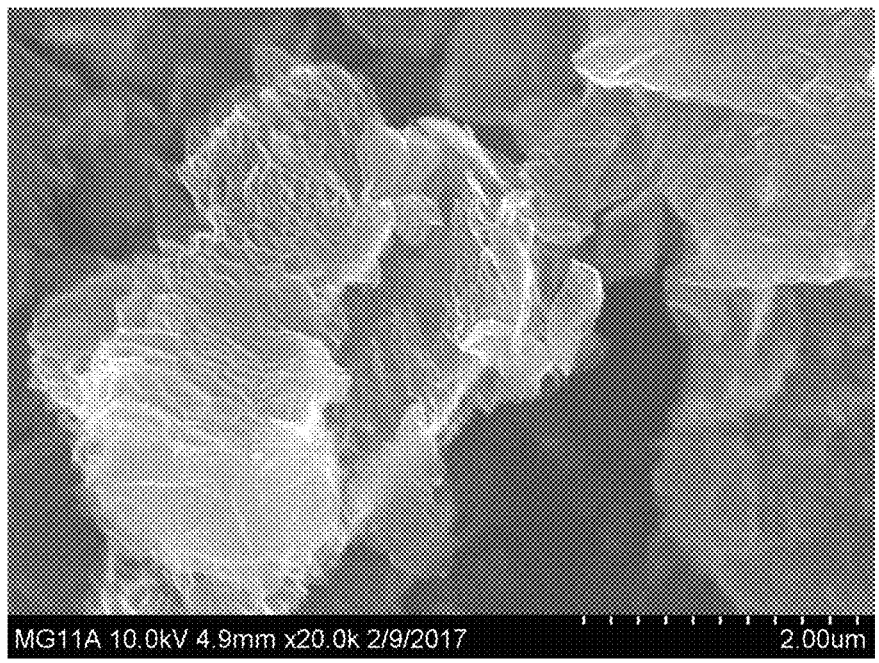
FIG. 4(B) An SEM image of exfoliated carbon (exfoliated carbon worms)
Figure 4C:
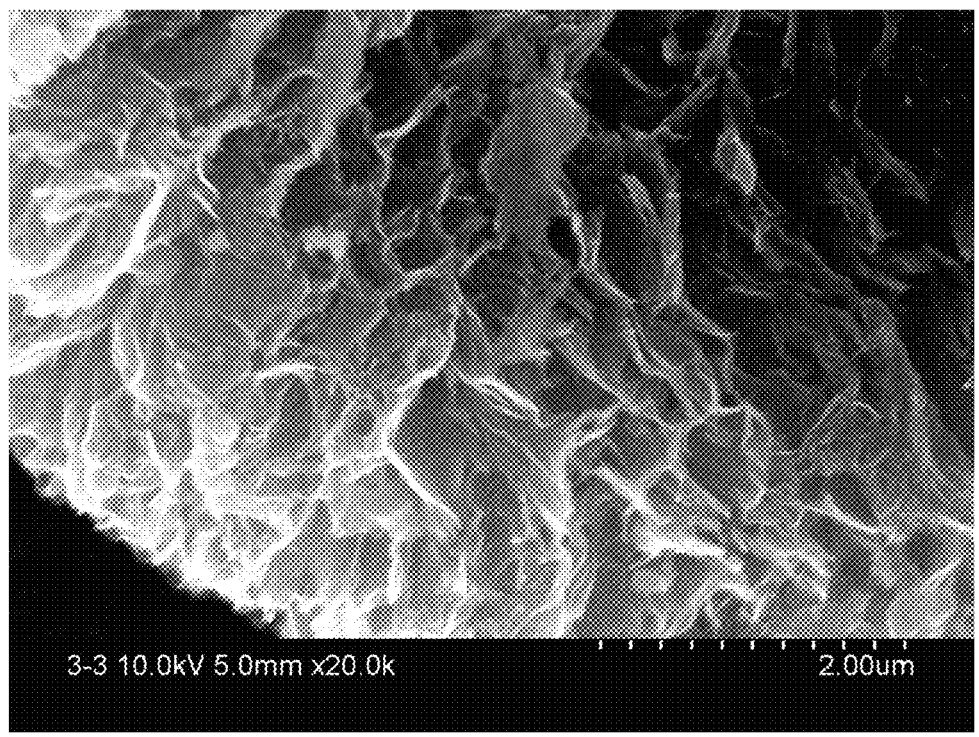
FIG. 4(C) Another SEM image of graphite worms.
Figure 4D:
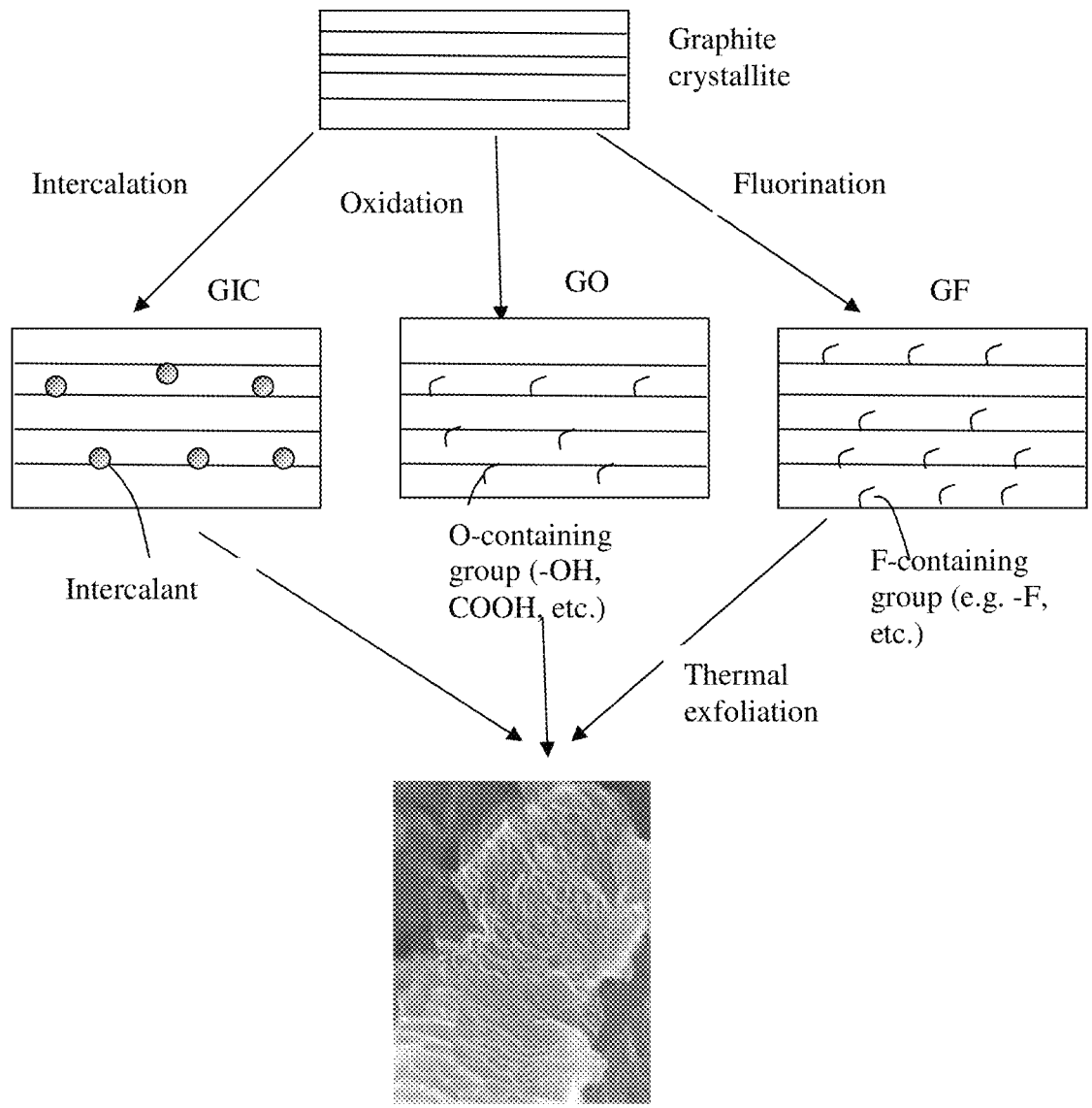
FIG. 4(D) Schematic drawing illustrating the approaches of producing thermally expanded/exfoliated graphite structures.

More specifically, due to the van der Waals forces holding the parallel graphene planes together being relatively weak, natural graphite can be treated so that the spacing between the graphene planes can be increased to provide a marked expansion in the c-axis direction. This results in a graphite material having an expanded spacing, but the laminar character of the hexagonal carbon layers is substantially retained. The inter-planar spacing (also referred to as inter-graphene spacing) of graphite crystallites can be increased (expanded)

via several approaches, including oxidation, fluorination, and/or intercalation of graphite. This is schematically illustrated in FIG. 4(D). The presence of an intercalant, oxygen-containing group, or fluorine-containing group serves to increase the spacing between two graphene planes in a graphite crystallite.

The inter-planar spaces between certain graphene planes may be significantly increased (actually, exfoliated) if the graphite/carbon material having expanded d spacing is exposed to a thermal shock (e.g. by rapidly placing this carbon material in a furnace pre-set at a temperature of typically 800-2,500° C.) without constraint (i.e. being allowed to freely increase volume). Under these conditions, the thermally exfoliated graphite/carbon material appears like worms, wherein each graphite worm is composed of many graphite flakes remaining interconnected (please see FIG. 4(C)). However, these graphite flakes have inter-flake pores typically in the pore size range of 20 nm to 10 µm.

Alternatively, the intercalated, oxidized, or fluorinated graphite/carbon material having expanded d spacing may be exposed to a moderate temperature (100-800° C.) under a constant-volume condition for a sufficient length of time. The conditions may be adjusted to obtain a product of limited exfoliation, having inter-flake pores of 2-20 nm in average size. This is herein referred to as a constrained expansion/exfoliation treatment. We have surprisingly observed that an Al cell having a cathode of graphite/carbon having inter-planar spaces 2-20 nm is capable of delivering a high energy density, high power density, and long cycle life.

In one process, graphite materials having an expanded inter-planar spacing are obtained by intercalating natural graphite particles with a strong acid and/or an oxidizing agent to obtain a graphite intercalation compound (GIC) or graphite oxide (GO), as illustrated in FIG. 4(A). The presence of chemical species or functional groups in the interstitial spaces between graphene planes serves to increase the inter-graphene spacing, $d_{002}$, as determined by X-ray diffraction, thereby significantly reducing the van der Waals forces that otherwise hold graphene planes together along the c-axis direction. The GIC or GO is most often produced by immersing natural graphite powder (100 in FIG. 4(A)) in a mixture of sulfuric acid, nitric acid (an oxidizing agent), and another oxidizing agent (e.g. potassium permanganate or sodium perchlorate). The resulting GIC (102) is actually some type of graphite oxide (GO) particles if an oxidizing agent is present during the intercalation procedure. This GIC or GO is then repeatedly washed and rinsed in water to remove excess acids, resulting in a graphite oxide suspension or dispersion, which contains discrete and visually discernible graphite oxide particles dispersed in water.

Water may be removed from the suspension to obtain "expandable graphite," which is essentially a mass of dried GIC or dried graphite oxide particles. The inter-graphene spacing, $d_{002}$, in the dried GIC or graphite oxide particles is typically in the range from 0.42-2.0 nm, more typically in the range from 0.5-1.2 nm. It may be noted than the "expandable graphite" is not "expanded graphite" (to be further explained later).

Upon exposure of expandable graphite to a temperature in the range from typically 800-2,500° C. (more typically 900-1,050° C.) for approximately 30 seconds to 2 minutes, the GIC undergoes a rapid volume expansion by a factor of 30-300 to form "exfoliated graphite" or "graphite worms" (104), Graphite worms are each a collection of exfoliated, but largely un-separated graphite flakes that remain interconnected (FIGS. 4(B) and 4(C)). In exfoliated graphite, individual graphite flakes (each containing 1 to several hundred of graphene planes stacked together) are highly spaced from one another, having a spacing of typically 2.0 nm-10 µm. However, they remain physically interconnected, forming an accordion or worm-like structure.

In graphite industry, graphite worms can be re-compressed to obtain flexible graphite sheets or foils (106) that typically have a thickness in the range from 0.1 mm (100 µm)-0.5 mm (500 µm). Such flexible graphite sheets may be used as a type of graphitic heat spreader element.

Alternatively, in graphite industry, one may choose to use a low-intensity air mill or shearing machine to simply break up the graphite worms for the purpose of producing the so-called "expanded graphite" flakes (108) which contain mostly graphite flakes or platelets thicker than 100 nm (hence, not a nano material by definition). It is clear that the "expanded graphite" is not "expandable graphite" and is not "exfoliated graphite worm" either. Rather, the "expandable graphite" can be thermally exfoliated to obtain "graphite worms," which, in turn, can be subjected to mechanical shearing to break up the otherwise interconnected graphite flakes to obtain "expanded graphite" flakes. Expanded graphite flakes typically have the same or similar inter-planar spacing (typically 0.335-0.36 nm) of their original graphite. Multiple expended graphite flakes may be roll-pressed together to form graphitic films, which are a variation of flexible graphite sheets.

Alternatively, the exfoliated graphite or graphite worms may be subjected to high-intensity mechanical shearing (e.g. using an ultrasonicator, high-shear mixer, high-intensity air jet mill, or high-energy ball mill) to form separated single-layer and multi-layer graphene sheets (collectively called NGPs, 112), as disclosed in our U.S. application Ser. No. 10/858,814 (U.S. Pat. Pub. No. 2005/0271574) (now abandoned). Single-layer graphene can be as thin as 0.34 nm, while multi-layer graphene can have a thickness up to 100 nm, but more typically less than 3 nm (commonly referred to as few-layer graphene). Multiple graphene sheets or platelets may be made into a sheet of NGP paper (114) using a paper-making process.

In GIC or graphite oxide, the inter-graphene plane separation has been increased from 0.3354 nm in natural graphite to 0.5-1.2 nm in highly oxidized graphite oxide, significantly weakening the van der Waals forces that hold neighboring planes together. Graphite oxide can have an oxygen content of 2%-50% by weight, more typically 20%-40% by weight. GIC or graphite oxide may be subjected to a special treatment herein referred to as "constrained thermal expansion". If GIC or graphite oxide is exposed to a thermal shock in a furnace (e.g. at 800-1,050° C.) and allowed to freely expand, the final product is exfoliated graphite worms. However, if the mass of GIC or graphite oxide is subjected to a constrained condition (e.g. being confined in an autoclave under a constant volume condition or under a uniaxial compression in a mold) while being slowly heated from 150° C. to 800° C. (more typically up to 600°) for a sufficient length of time (typically 2 minutes to 15 minutes), the extent of expansion can be constrained and controlled, and the product can have inter-flake spaces from 2.0 nm to 20 nm, or more desirably from 2 nm to 10 nm.

It may be noted that the "expandable graphite" or graphite with expanded inter-planar spacing may also be obtained by forming graphite fluoride (GF), instead of GO. Interaction of $F_2$ with graphite in a fluorine gas at high temperature leads to covalent graphite fluorides, from $(CF)_2$ to $(C_2F)_2$, while at low temperatures graphite intercalation compounds (GIC) $C_xF$ ($2 \leq x \leq 24$) form. In $(CF)_2$ carbon atoms are sp3-hybridized and thus the fluorocarbon layers are corrugated consisting of trans-linked cyclohexane chairs. In $(C_2F)_2$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents (e.g. mixtures of $F_2$ with $Br_2$, $Cl_2$, or $I_2$) may be used, although most of the available literature involves fluorination with $F_2$ gas, sometimes in presence of fluorides.

We have observed that lightly fluorinated graphite, $C_xF$ ($2 \leq x \leq 24$), obtained from electrochemical fluorination, typically has an inter-graphene spacing ($d_{002}$) less than 0.37 nm, more typically <0.35 nm. Only when x in $C_xF$ is less than 2 (i.e. $0.5 \leq x < 2$) can one observe a $d_{002}$ spacing greater than 0.5 nm (in fluorinated graphite produced by a gaseous phase fluorination or chemical fluorination procedure). When x in $C_xF$ is less than 1.33 (i.e. $0.5 \leq x < 1.33$) one can observe a $d_{002}$ spacing greater than 0.6 nm. This heavily fluorinated graphite is obtained by fluorination at a high temperature (>>200° C.) for a sufficiently long time, preferably under a pressure >1 atm, and more preferably >3 atm. For reasons remaining unclear, electrochemical fluorination of graphite leads to a product having a d spacing less than 0.4 nm even though the product $C_xF$ has an x value from 1 to 2. It is possible that F atoms electrochemically introduced into graphite tend to reside in defects, such as grain boundaries, instead of between graphene planes and, consequently, do not act to expand the inter-graphene planar spacing.

The nitrogenation of graphite can be conducted by exposing a graphite oxide material to ammonia at high temperatures (200-400° C.). Nitrogenation may also be conducted at lower temperatures by a hydrothermal method; e.g. by sealing GO and ammonia in an autoclave and then increased the temperature to 150-250° C.

In addition to N, O, F, Br, Cl, or H, the presence of other chemical species (e.g. Na, Li, K, Ce, Ca, Fe, $NH_4$, etc.) between graphene planes can also serve to expand the inter-planar spacing, creating room to accommodate electrochemically active materials therein. The expanded interstitial spaces between graphene planes (hexagonal carbon planes or basal planes) are found by us in this study to be surprisingly capable of accommodating $Al^{+3}$ ions and other anions (derived from electrolyte ingredients) as well, particularly when the spaces are from 2.0 nm to 20 nm. It may be noted that graphite can electrochemically intercalated with such chemical species as Na, Li, K, Ce, Ca, $NH_4$, or their combinations, which can then be chemically or electrochemically ion-exchanged with metal elements (Bi, Fe, Co, Mn, Ni, Cu, etc.). All these chemical species can serve to expand the inter-planar spacing. The spacing may be dramatically expanded (exfoliated) to have inter-flake pores that are 20 nm-10 μm in size.

A second type of graphitic film for use as a graphitic heat spreader is a pyrolitic graphite film, also referred to as artificial graphite film, which is produced from a carbon precursor, such as a polymer film or pitch film. For instance, the process begins with carbonizing a polymer film at a carbonization temperature of 400-1,500° C. under a typical pressure of 10-15 kg/cm² for 2-10 hours to obtain a carbonized material, which is followed by a graphitization treatment at 2,500-3,200° C. under an ultrahigh pressure of 100-300 kg/cm² for 1-5 hours to form a graphitic film. The carbon precursor polymer may be preferably selected from the group consisting of polyimide, polyamide, polyoxadiazole, polybenzoxazole, polybenzobisoxazole, polythiazole, polybenzothiazole, polybenzobisthiazole, poly(p-phenylene vinylene), polybenzimidazole, polybenzobisimidazole, phenolic resin, composites thereof (containing graphene sheets and/or graphite flakes dispersed in the carbon precursor film), and combinations thereof. These polymers are found to have a high carbon yield when they are carbonized and/or graphitized.

An example of this process is disclosed in Y. Nishikawa, et al. "Filmy graphite and process for producing the same," U.S. Pat. No. 7,758,842 (Jul. 20, 2010) and in Y. Nishikawa, et al. "Process for producing graphite film," U.S. Pat. No. 8,105,565 (Jan. 31, 2012).

One of the more desirable thermal interface materials for use in the presently invented battery cooling system is graphene foam. Generally speaking, a foam or foamed material is composed of pores (or cells) and pore walls (a solid material). The pores can be interconnected to form an open-cell foam. A graphene foam is composed of pores and pore walls that contain a graphene material. There are four major methods of producing graphene foams:

The first method is the hydrothermal reduction of graphene oxide hydrogel that typically involves sealing graphene oxide (GO) aqueous suspension in a high-pressure autoclave and heating the GO suspension under a high pressure (tens or hundreds of atm) at a temperature typically in the range from 180-300° C. for an extended period of time (typically 12-36 hours). A useful reference for this method is given here: Y. Xu, et al. "Self-Assembled Graphene Hydrogel via a One-Step Hydrothermal Process," ACS Nano 2010, 4, 4324-4330.

The second method is based on a template-assisted catalytic CVD process, which involves CVD deposition of graphene on a sacrificial template (e.g. Ni foam). The graphene material conforms to the shape and dimensions of the Ni foam structure. The Ni foam is then etched away using an etching agent, leaving behind a monolith of graphene skeleton that is essentially an open-cell foam. A useful reference for this method is given here: Zongping Chen, et al., "Three-dimensional flexible and conductive interconnected graphene networks grown by chemical vapour deposition," Nature Materials, 10 (June 2011) 424-428.

The third method of producing graphene foam also makes use of a sacrificial material (e.g. colloidal polystyrene particles, PS) that is coated with graphene oxide sheets using a self-assembly approach. For instance, Choi, et al. prepared chemically modified graphene (CMG) paper in two steps: fabrication of free-standing PS/CMG films by vacuum filtration of a mixed aqueous colloidal suspension of CMG and PS (2.0 μm PS spheres), followed by removal of PS beads to generate 3D macro-pores. [B. G. Choi, et al., "3D Macroporous Graphene Frameworks for Supercapacitors with High Energy and Power Densities," ACS Nano, 6 (2012) 4020-4028.] Choi, et al. fabricated well-ordered free-standing PS/CMG paper by filtration, which began with separately preparing a negatively charged CMG colloidal and a positively charged PS suspension. A mixture of CMG colloidal and PS suspension was dispersed in solution under controlled pH (=2), where the two compounds had the same surface charges (zeta potential values of +13±2.4 mV for CMG and +68±5.6 mV for PS). When the pH was raised to 6, CMGs (zeta potential=−29±3.7 mV) and PS spheres (zeta potential=+51±2.5 mV) were assembled due to the electrostatic interactions and hydrophobic characteristics between them, and these were subsequently integrated into PS/CMG composite paper through a filtering process.

The fourth method for producing a solid graphene foam composed of multiple pores and pore walls was invented by us earlier [Aruna Zhamu and Bor Z. Jang, "Highly Conductive Graphene Foams and Process for Producing Same," U.S. patent application Ser. No. 14/120,959 (Jul. 17, 2014)]. The process comprises:

(a) preparing a graphene dispersion having a graphene material dispersed in a liquid medium, wherein the graphene material is selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof and wherein the dispersion contains an optional blowing agent;

(b) dispensing and depositing the graphene dispersion onto a surface of a supporting substrate (e.g. plastic film, rubber sheet, metal foil, glass sheet, paper sheet, etc.) to form a wet layer of graphene material, wherein the dispensing and depositing procedure includes subjecting the graphene dispersion to an orientation-inducing stress;

(c) partially or completely removing the liquid medium from the wet layer of graphene material to form a dried layer of graphene material having a content of non-carbon elements (e.g. O, H, N, B, F, Cl, Br, I, etc.) no less than 5% by weight; and (d) heat treating the dried layer of graphene material at a first heat treatment temperature from 100° C. to 3,200° C. at a desired heating rate sufficient to induce volatile gas molecules from the non-carbon elements or to activate said blowing agent for producing the solid graphene foam having a density from 0.01 to 1.7 g/cm$^3$ (more typically from 0.1 to 1.5 g/cm$^3$, and even more typically from 0.1 to 1.0 g/cm$^3$, and most typically from 0.2 to 0.75 g/cm$^3$), or a specific surface area from 50 to 3,000 m$^2$/g (more typically from 200 to 2,000 m$^2$/g, and most typically from 500 to 1,500 m$^2$/g).

This optional blowing agent is not required if the graphene material has a content of non-carbon elements (e.g. O, H, N, B, F, Cl, Br, I, etc.) no less than 5% by weight (preferably no less than 10%, further preferably no less than 20%, even more preferably no less than 30% or 40%, and most preferably up to 50%). The subsequent high temperature treatment serves to remove a majority of these non-carbon elements from the graphene material, generating volatile gas species that produce pores or cells in the solid graphene material structure. In other words, quite surprisingly, these non-carbon elements play the role of a blowing agent. Hence, an externally added blowing agent is optional (not required). However, the use of a blowing agent can provide added flexibility in regulating or adjusting the porosity level and pore sizes for a desired application. The blowing agent is typically required if the non-carbon element content is less than 5%, such as pristine graphene that is essentially all-carbon.

The graphene foam produced by the fourth method has the highest thermal conductivity among all graphene foam materials, and also exhibit a highly reversible and durable elastic deformation under tension or compression, enabling good, long-term contact between a heat spreader element and a battery cell surface.

The rechargeable battery may be a lithium-ion battery, lithium metal secondary battery, lithium-sulfur battery, lithium-air battery, lithium-selenium battery, sodium-ion battery, sodium metal secondary battery, sodium-sulfur battery, sodium-air battery, magnesium-ion battery, magnesium metal battery, aluminum-ion battery, aluminum metal secondary battery, zinc-ion battery, zinc metal battery, zinc-air battery, nickel metal hydride battery, lead acid battery, lead acid-carbon battery, lead acid-based ultra-battery, lithium-ion capacitor, or supercapacitor.

There is no limitation on the type of anode materials, electrolytes, cathode materials, etc. that can be used in the presently invented battery.

The anode of a lithium-ion battery (as an example) may contain an anode active material selected from the group consisting of: (A) lithiated and un-lithiated silicon (Si), germanium (Ge), tin (Sn), lead (Pb), antimony (Sb), bismuth (Bi), zinc (Zn), aluminum (Al), titanium (Ti), nickel (Ni), cobalt (Co), phosphorus (P), and cadmium (Cd); (B) lithiated and un-lithiated alloys or intermetallic compounds of Si, Ge, Sn, Pb, Sb, Bi, Zn, Al, Ti, Ni, Co, or Cd with other elements; (C) lithiated and un-lithiated oxides, carbides, nitrides, sulfides, phosphides, selenides, and tellurides of Si, Ge, Sn, Pb, Sb, Bi, Zn, Al, Ti, Fe, Ni, Co, or Cd, and their mixtures, composites, or lithium-containing composites; (D) lithiated and un-lithiated salts and hydroxides of Sn; (E) lithium titanate, lithium manganate, lithium aluminate, lithium-containing titanium oxide, lithium titanium-niobium oxide, lithium transition metal oxide; (F) carbon or graphite particles; and combinations thereof.

The cathode may contain a cathode active material selected from an inorganic material, an organic material, an intrinsically conducting polymer (known to be capable of string lithium ions), a metal oxide/phosphate/sulfide, or a combination thereof. The metal oxide/phosphate/sulfide may be selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, sodium cobalt oxide sodium nickel oxide, sodium manganese oxide, sodium vanadium oxide, sodium-mixed metal oxide, sodium iron phosphate, sodium manganese phosphate, sodium vanadium phosphate, sodium mixed metal phosphate, transition metal sulfide, lithium polysulfide, sodium polysulfide, magnesium polysulfide, or a combination thereof.

In some embodiments, the electrode active material may be a cathode active material selected from sulfur, sulfur compound, sulfur-carbon composite, sulfur-polymer composite, lithium polysulfide, transition metal dichalcogenide, a transition metal trichalcogenide, or a combination thereof. The inorganic material may be selected from TiS$_2$, TaS$_2$, MoS$_2$, NbSe$_3$, MnO$_2$, CoO$_2$, an iron oxide, a vanadium oxide, or a combination thereof. This group of materials is particularly suitable for use as a cathode active material of a lithium metal battery.

The metal oxide/phosphate/sulfide contains a vanadium oxide selected from the group consisting of VO$_2$, Li$_x$VO$_2$, V$_2$O$_5$, Li$_x$V$_2$O$_5$, V$_3$O$_8$, Li$_x$V$_3$O$_5$, Li$_x$V$_3$O$_7$, V$_4$O$_9$, Li$_x$V$_4$O$_9$, V$_6$O$_{13}$, Li$_x$V$_6$O$_{13}$, their doped versions, their derivatives, and combinations thereof, wherein $0.1<x<5$. In some embodiments, the metal oxide/phosphate/sulfide is selected from a layered compound LiMO$_2$, spinel compound LiM$_2$O$_4$, olivine compound LiMPO$_4$, silicate compound Li$_2$MSiO$_4$, Tavorite compound LiMPO$_4$F, borate compound LiMBO$_3$, or a combination thereof, wherein M is a transition metal or a mixture of multiple transition metals.

The inorganic material may be selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

The organic material or polymeric material may be selected from Poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ($[(NPS_2)_3]n$), lithiated 1,4,5,8-naphthalenetetraol formaldehyde polymer, Hexaazatrinaphtylene (HATN), Hexaazatriphenylene hexacarbonitrile (HAT(CN)$_6$), 5-Benzylidene hydantoin, Isatine lithium salt, Pyromellitic diimide lithium salt, tetrahydroxy-p-benzoquinone derivatives (THQLi$_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, $Li_4C_6O_6$, $Li_2C_6O_6$, $Li_6C_6O_6$, or a combination thereof. These compounds are preferably mixed with a conducting material to improve their electrical conductivity, rigidity and strength so as to enable the peeling-off of graphene sheets from the graphitic material particles.

The thioether polymer in the above list may be selected from Poly[methanetetryl-tetra(thiomethylene)] (PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di(1,3-dithiolan-2-yl)benzene) (PDDTB), poly(tetrahydrobenzodithiophene) (PTHBDT), poly[1,2,4,5-tetrakis(propylthio)benzene] (PTKPTB, or poly[3,4(ethylenedithio)thiophene] (PEDTT).

In some embodiments, the organic material contains a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof. These compounds are preferably mixed with a conducting material to improve their electrical conductivity and rigidity so as to enable the peeling-off of graphene sheets from the graphitic material particles.

There is no limitation on the type of electrolyte that can be incorporated in the fast-chargeable battery: liquid electrolyte (e.g. organic solvent or ionic solid based electrolyte), polymer gel electrolyte, quasi-solid electrolyte, solid polymer electrolyte, inorganic solid electrolyte, composite electrolyte, etc. Batteries featuring a polymer or inorganic solid electrolyte may require a higher recharge temperature, having Tc typically from 50 to 90° C.

The following examples serve to provide the best modes of practice for the present disclosure and should not be construed as limiting the scope of the disclosure:

Example 1: Preparation of Single-Layer Graphene Sheets and Graphene Heat Spreader Films from Meso-Carbon Micro-Beads (MCMBs)

Meso-carbon microbeads (MCMBs) were supplied from China Steel Chemical Co., Kaohsiung, Taiwan. This material has a density of about 2.24 g/cm$^3$ with a median particle size of about 16 μm. MCMB (10 grams) were intercalated with an acid solution (sulfuric acid, nitric acid, and potassium permanganate at a ratio of 4:1:0.05) for 48-96 hours. Upon completion of the reaction, the mixture was poured into deionized water and filtered. The intercalated MCMBs were repeatedly washed in a 5% solution of HCl to remove most of the sulfate ions. The sample was then washed repeatedly with deionized water until the pH of the filtrate was no less than 4.5. The slurry was then subjected ultrasonication for 10-100 minutes to produce GO suspensions. TEM and atomic force microscopic studies indicate that most of the GO sheets were single-layer graphene when the oxidation treatment exceeded 72 hours, and 2- or 3-layer graphene when the oxidation time was from 48 to 72 hours.

The GO sheets contain oxygen proportion of approximately 35%-47% by weight for oxidation treatment times of 48-96 hours. GO sheets were suspended in water. The GO suspension was cast into thin graphene oxide films on a glass surface and, separately, was also slot die-coated onto a PET film substrate, dried, and peeled off from the PET substrate to form GO films. The GO films were separately heated from room temperature to 2,500° C. and then roll-pressed to obtain reduced graphene oxide (RGO) films for use as a heat spreader. The thermal conductivity of these films were found to be from 1,225 to 1,750 W/mK using Neitze heat conductivity measuring device.

Example 2: Preparation of Pristine Graphene Sheets (0% Oxygen) and Pristine Graphene Heat Spreader Films Pristine graphene sheets were produced by using the direct ultrasonication or liquid-phase production process. In a typical procedure, five grams of graphite flakes, ground to approximately 20 m or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. There are no other non-carbon elements.

The pristine graphene sheets were immersed into a 10 mM acetone solution of BPO for 30 min and were then taken out drying naturally in air. The heat-initiated chemical reaction to functionalize graphene sheets was conducted at 80° C. in a high-pressure stainless steel container filled with pure nitrogen. Subsequently, the samples were rinsed thoroughly in acetone to remove BPO residues for subsequent Raman characterization. As the reaction time increased, the characteristic disorder-induced D band around 1330 cm$^{-1}$ emerged and gradually became the most prominent feature of the Raman spectra. The D-band is originated from the $A_{1g}$ mode breathing vibrations of six-membered sp2 carbon rings, and becomes Raman active after neighboring sp2 carbon atoms are converted to sp$^3$ hybridization. In addition, the double resonance 2D band around 2670 cm$^{-1}$ became significantly weakened, while the G band around 1580 cm$^{-1}$ was broadened due to the presence of a defect-induced D' shoulder peak at ~1620 cm$^{-1}$. These observations suggest that covalent C—C bonds were formed and thus a degree of structural disorder was generated by the transformation from sp2 to sp3 configuration due to reaction with BPO.

The functionalized graphene sheets were re-dispersed in water to produce a graphene dispersion. The dispersion was then made into graphene films using comma coating and subjected to heat treatments up to 2,500° C. The heat spreader films obtained from functionalized graphene sheets exhibit a thermal conductivity from 1,450 to 1,750 W/mK. On a separate basis, non-functionalized pristine graphene powder was directly compressed into graphene films (aggregates of graphene sheets) using pairs of steel rollers; no subsequent heat treatment was conducted. These graphene films exhibit a thermal conductivity typically from approximately 600 to about 1,000 W/mK.

Example 3: Preparation of Graphene Fluoride Sheets and Graphene Heat Spreader Films Several processes have been used by us to produce GF, but only one process is herein described as an example. In a typical procedure, highly exfoliated graphite (HEG) was prepared from intercalated compound $C_2F-xClF_3$. HEG was further fluorinated by vapors of chlorine trifluoride to yield fluorinated highly exfoliated graphite (FHEG). Pre-cooled Teflon reactor was filled with 20-30 mL of liquid pre-cooled $ClF_3$, the reactor was closed and cooled to liquid nitrogen temperature. Then, no more than 1 g of HEG was put in a container with holes for $ClF_3$ gas to access and situated inside the reactor. In 7-10 days a gray-beige product with approximate formula $C_2F$ was formed.

Subsequently, a small amount of FHEG (approximately 0.5 mg) was mixed with 20-30 mL of an organic solvent (methanol, ethanol, 1-propanol, 2-propanol, 1-butanol, tert-butanol, isoamyl alcohol) and subjected to an ultrasound treatment (280 W) for 30 min, leading to the formation of homogeneous yellowish dispersions. Five minutes of sonication was enough to obtain a relatively homogenous dispersion, but a longer sonication time ensured better stability. Upon extrusion to form wet films on a glass surface with the solvent removed, the dispersion became brownish films formed on the glass surface. The dried films, upon drying and roll-pressing, became heat spreader films having a reasonably good thermal conductor (thermal conductivity from 250 to 750 W/mK), yet an electrical insulator. The unique combination of electrical insulation and thermal conduction characteristics is of particular interest for battery heating configurations wherein there is no concern of any potential negative effect cause by an electrical conductor.

Example 4: Preparation of Nitrogenated Graphene Sheets and Graphene Films for Use as a Heat Spreader Element Graphene oxide (GO), synthesized in Example 1, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene/urea mass ratios of 1/0.5, 1/1 and 1/2 have the nitrogen contents of 14.7, 18.2 and 17.5 wt. %, respectively, as found by elemental analysis. These nitrogenated graphene sheets, without prior chemical functionalization, remain dispersible in water. The resulting suspensions were then coated and made into wet films and then dried. The dried films were roll-pressed to obtain graphene films, having a thermal conductivity from 350 to 820 W/mK. These films are also electrical insulators.

Example 5: Fast-Chargeable Lithium-Ion, Sodium-Ion, Lithium Metal, Lithium-Sulfur Batteries Enabled by Heat-Spreader Heating For most of the anode and cathode active materials investigated, we prepared lithium-ion cells or lithium metal cells using the conventional slurry coating method. A typical anode composition includes 85 wt. % active material (e.g., graphene-encapsulated Si, SiO, $SnO_2$, and $Co_3O_4$ particles available from Angstron Energy Co., Dayton, Ohio), 7 wt. % acetylene black (Super-P), and 8 wt. % polyvinylidene fluoride binder (PVDF, 5 wt. % solid content) dissolved in N-methyl-2-pyrrolidinoe (NMP). After coating the slurries on Cu foil, the electrodes were dried at 120° C. in vacuum for 2 h to remove the solvent. It may be noted that Cu foil recited here is used as a current collector that allows electric current to go in and out of the anode electrode. A separate sheet of Cu foil may be added as a heat spreader element for heat-transporting purpose, not for conducting electrons.

Cathode layers (e.g. LFP, NCM, $LiCoO_2$, etc.) are made in a similar manner (using Al foil as the cathode current collector) using the conventional slurry coating and drying procedures. An anode layer, separator layer (e.g. Celgard 2400 membrane), a cathode layer, and a heat spreader layer (graphene film, flexible graphite sheet, Cu foil, Ni foil, etc.) are then laminated together and housed in a plastic-Al envelop (a protective housing or casing). An anode tab or terminal, a cathode tab, and a heat spreader tab are allowed to get protruded out of the protective housing, as illustrated in FIG. 1(A).

The cell is then injected with 1 M $LiPF_6$ electrolyte solution dissolved in a mixture of ethylene carbonate (EC) and diethyl carbonate (DEC) (EC-DEC, 1:1 v/v). In some cells, ionic liquids were used as the liquid electrolyte. The cell assemblies were made in an argon-filled glove-box.

The cyclic voltammetry (CV) measurements were carried out using an Arbin electrochemical workstation at a typical scanning rate of 1-100 mV/s. In addition, the electrochemical performances of various cells were also evaluated by galvanostatic charge/discharge cycling at a current density of from 50 mA/g to 10 A/g. For long-term cycling tests, multi-channel battery testers manufactured by LAND were used. An environment-controlled oven was used to perform battery testing at different temperatures when desired.

Example 6: Some Examples of Cathode Active Materials for a Lithium Metal Battery Cathode active materials in lithium-ion or lithium metal secondary batteries are known to have a relatively low thermal conductivity. It is thus advantageous to encapsulate cathode active material particles with graphene which, if coupled with a high thermal conductivity heat spreader (e.g. graphene film or artificial graphite film from graphitized PI), enables faster heating of the battery to a desired temperature for fast charging.

For instance, lithium iron phosphate (LFP) powder, un-coated or carbon-coated, is commercially available from several sources. The carbon-coated LFP powder and un-coated LFP powder samples were separately mixed with natural graphite particles in ball mill pots of a high-intensity ball mill apparatus. The apparatus was operated for 0.5 to 4 hours for each LFP material to produce graphene-encapsulated LFP particles.

$V_2O_5$ powder is commercially available. A mixture of $V_2O_5$ powder and natural graphite (10/1 weight ratio) was sealed in each of 4 ball milling pots symmetrically positioned in a high-intensity ball mill. The mill was operated for 1 hour to produce particulates of graphene-encapsulated $V_2O_5$ particles, which were implemented as the cathode active material in a lithium metal battery. Coated primary particles, 2-7.5% by weight pristine graphene or amine-functionalized graphene sheets, and a small amount of surfactant (Triton-100) were added into deionized water to make slurries. The slurries were then ultrasonic sprayed onto glass substrate surface to form particulates.

In a set of experiments, a mixture of $LiCoO_2$ powder and natural graphite (100/1-10/1 weight ratio) was sealed in each of 4 ball milling pots symmetrically positioned in a high-intensity ball mill. The mill was operated for 0.5-4 hours to produce particulates of graphene-encapsulated $LiCoO_2$ particles.

Example 7: Organic Cathode Active Material ($Li_2C_6O_6$) of a Fast-Chargeable Lithium Metal Battery The experiments associated with this example were conducted to determine if organic materials, such as $Li_2C_6O_6$, can be encapsulated in graphene sheets using the presently invented direct transfer method. The result is that organic active materials alone are typically incapable of peeling off graphene sheets from graphite particles. However, if a second active material (i.e. rigid particles of an inorganic material or a metal oxide/phosphate/sulfide) is implemented along with an organic active material in a ball milling pot, then the organic material particles and inorganic material particles can be separately or concurrently encapsulated to form graphene-encapsulated organic particles, graphene-encapsulated inorganic particles, and graphene-encapsulated mixture of organic and inorganic particles. This is interesting and surprising.

In order to synthesize dilithium rhodizonate ($Li_2C_6O_6$), the rhodizonic acid dihydrate (species 1 in the following scheme) was used as a precursor. A basic lithium salt, $Li_2CO_3$ can be used in aqueous media to neutralize both enediolic acid functions. Strictly stoichiometric quantities of both reactants, rhodizonic acid and lithium carbonate, were allowed to react for 10 hours to achieve a yield of 90%. Dilithium rhodizonate (species 2) was readily soluble even in a small amount of water, implying that water molecules are present in species 2. Water was removed in a vacuum at 180° C. for 3 hours to obtain the anhydrous version (species 3).

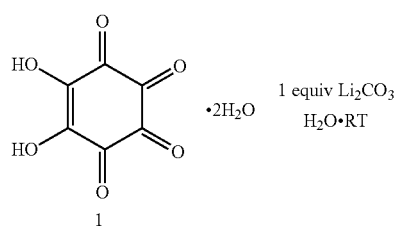

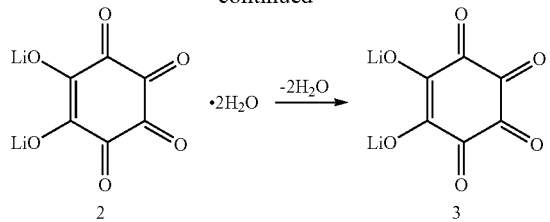

A mixture of an organic cathode active material ($Li_2C_6O_6$) and an inorganic cathode active material ($V_2O_5$ and $MoS_2$, separately) was ball-milled for 0.5-2.0 hours to obtain a mixture of graphene-encapsulated particles.

Coated primary particles, 2-7.5% by weight pristine graphene or amine-functionalized graphene sheets, and a small amount of surfactant (Triton-100) were added into deionized water to make slurries. The slurries were then ultrasonic sprayed onto glass substrate surface to form particulates. It may be noted that the two Li atoms in the formula $Li_2C_6O_6$ are part of the fixed structure and they do not participate in reversible lithium ion storing and releasing. This implies that lithium ions must come from the anode side. Hence, there must be a lithium source (e.g. lithium metal or lithium metal alloy) at the anode. In one battery cell herein tested, the anode current collector (Cu foil) is deposited with a layer of lithium (via sputtering). The resulting cell is a lithium metal cell. Flexible graphite sheets, Cu foil, and graphene fluoride films were used as a heat spreader element material to enable fast chargeability.

Example 8: Graphene-Encapsulated $Na_3V_2(PO_4)_3/C$ and $Na_3V_2(PO_4)_3$ Cathodes for Sodium Metal Batteries The $Na_3V_2(PO_4)_3/C$ sample was synthesized by a solid state reaction according to the following procedure: a stoichiometric mixture of $NaH_2PO_4·2H_2O$ (99.9%, Alpha) and $V_2O_3$ (99.9%, Alpha) powders was put in an agate jar as a precursor and then the precursor was ball-milled in a planetary ball mill at 400 rpm in a stainless steel vessel for 8 h. During ball milling, for the carbon coated sample, sugar (99.9%, Alpha) was also added as the carbon precursor and the reductive agent, which prevents the oxidation of $V^{3+}$. After ball milling, the mixture was heated at 900° C. for 24 h in Ar atmosphere. Separately, the $Na_3V_2(PO_4)_3$ powder was prepared in a similar manner, but without sugar. Samples of both powders were then subjected to ball milling in the presence of natural graphite particles to prepare graphene-encapsulated $Na_3V_2(PO_4)_3$ particles and graphene-encapsulated carbon-coated $Na_3V_2(PO_4)_3$ particles. Coated primary particles, 5-13.5% by weight pristine graphene or amine-functionalized graphene sheets, and a small amount of surfactant (Triton-100) were added into deionized water to make slurries. The slurries were then spray-dried to form particulates.

The particulates of cathode active materials were used in several Na metal cells containing 1 M of $NaPF_6$ salt in PC+DOL as the electrolyte. It was discovered that graphene encapsulation significantly improved the cycle stability of all Na metal cells studied. In terms of cycle life, the following sequence was observed: graphene-encapsulated $Na_3V_2(PO_4)_3/C$ >graphene-encapsulated $Na_3V_2(PO_4)_3$>$Na_3V_2(PO_4)_3/C$ >$Na_3V_2(PO_4)_3$. The incorporation of graphene films or PI-derived graphitic films, used as a heat spreader, enables the sodium metal cells to be recharged in less than 10 minutes at 60° C.

Example 9: Preparation of Graphene-Encapsulated MoS₂ Particles as a Cathode Active Material of a Na Metal Battery (Fast Chargeability Enabled by a Heat-Spreader Element)

A wide variety of inorganic materials were investigated in this example. For instance, an ultra-thin $MoS_2$ material was synthesized by a one-step solvothermal reaction of $(NH_4)_2MoS_4$ and hydrazine in N, N-dimethylformamide (DMF) at 200° C. In a typical procedure, 22 mg of $(NH_4)_2MoS_4$ was added to 10 ml of DMF. The mixture was sonicated at room temperature for approximately 10 min until a clear and homogeneous solution was obtained. After that, 0.1 ml of $N_2H_4 \cdot H_2O$ was added. The reaction solution was further sonicated for 30 min before being transferred to a 40 mL Teflon-lined autoclave. The system was heated in an oven at 200° C. for 10 h. Product was collected by centrifugation at 8000 rpm for 5 min, washed with DI water and recollected by centrifugation. The washing step was repeated for 5 times to ensure that most DMF was removed.

Subsequently, $MoS_2$ particles were dried and subjected to graphene encapsulation by high-intensity ball milling in the presence of natural graphite particles. An Al foil and a flexible graphite sheet were separately used as a heat spreader element in constructing a fast-chargeable Na metal battery.

Example 10: Preparation of Graphene-Encapsulated MnO₂ and NaMnO₂ Cathode Active Material for Fast-Chargeable Na Metal Cells and Zn Metal Cells Featuring a Heat Spreader Element For the preparation of the $MnO_2$ powder, a 0.1 mol/L $KMnO_4$ aqueous solution was prepared by dissolving potassium permanganate in deionized water. Meanwhile, 13.32 g surfactant of high purity sodium bis(2-ethylhexyl) sulfosuccinate was added in 300 mL iso-octane (oil) and stirred well to get an optically transparent solution. Then, 32.4 mL of 0.1 mol/L $KMnO_4$ solution was added into the solution, which was ultrasonicated for 30 min to prepare a dark brown precipitate. The product was separated, washed several times with distilled water and ethanol, and dried at 80° C. for 12 h. Some amount of the $MnO_2$ powder was then subjected to the direct transfer treatment to obtain graphene-encapsulated $MnO_2$ particles.

Additionally, $NaMnO_2$ particles were synthesized by ball-milling a mixture of $Na_2CO_3$ and $MnO_2$ (at a molar ratio of 1:2) for 12 h followed by heating at 870° C. for 10 h. The resulting $NaMnO_2$ particles were then subjected to ball-milling in the presence of MCMB particles to prepare graphene encapsulated $NaMnO_2$ particles.

The $MnO_2$ particles, with or without graphene encapsulation, are also incorporated in alkaline $Zn/MnO_2$ cells. Graphene encapsulation was found to dramatically increase the cycle life of this type of cell. The Zn-graphene/$MnO_2$ battery is composed of a graphene/$MnO_2$-based cathode (with an optional cathode current collector and an optional conductive filler), a Zn metal or alloy-based anode (with an optional anode current collector), and an aqueous electrolyte (e.g. a mixture of a mild $ZnSO_4$ or $Zn(NO_3)_2$ with $MnSO_4$ in water). Graphene films (RGO) were used as a heat spreader element in the battery cell to enable fast charge-ability.

Example 11: Production of Graphitic Films Through Oxidation of Graphite, Thermal Expansion/Exfoliation of Oxidized Graphite, and Re-Compression of Exfoliated Graphite Natural flake graphite, nominally sized at 45 µm, provided by Asbury Carbons (405 Old Main St., Asbury, N.J. 08802, USA) was milled to reduce the size to approximately 14 m (Sample 1a). The chemicals used in the present study, including fuming nitric acid (>90%), sulfuric acid (95-98%), potassium chlorate (98%), and hydrochloric acid (37%), were purchased from Sigma-Aldrich and used as received. Graphite oxide (GO) samples were prepared according to the following procedure:

Sample 1A: A reaction flask containing a magnetic stir bar was charged with sulfuric acid (176 mL) and nitric acid (90 mL) and cooled by immersion in an ice bath. The acid mixture was stirred and allowed to cool for 15 min, and graphite (10 g) was added under vigorous stirring to avoid agglomeration. After the graphite powder was well dispersed, potassium chlorate (110 g) was added slowly over 15 min to avoid sudden increases in temperature. The reaction flask was loosely capped to allow evolution of gas from the reaction mixture, which was stirred for 24 hours at room temperature. On completion of the reaction, the mixture was poured into 8 L of deionized water and filtered. The GO was re-dispersed and washed in a 5% solution of HCl to remove sulfate ions. The filtrate was tested intermittently with barium chloride to determine if sulfate ions are present. The HCl washing step was repeated until this test was negative. The GO was then washed repeatedly with deionized water until the pH of the filtrate was neutral. The GO slurry was spray-dried and stored in a vacuum oven at 60° C. until use.

Two additional samples were also prepared: The same procedure as in Sample 1A was followed, but the reaction time was 48 hours, to obtain Sample 1B. For the preparation of Sample 1C, the same procedure as in Sample 1A was followed, but the reaction time was 96 hours.

X-ray diffraction studies showed that after a treatment of 24 hours, a significant proportion of graphite has been transformed into graphite oxide. The peak at 2θ=26.3 degrees, corresponding to an inter-planar spacing of 0.335 nm (3.35 Å) for pristine natural graphite was significantly reduced in intensity after a deep oxidation treatment for 24 hours and a peak typically near 2θ=9-14 degrees (depending upon degree of oxidation) appeared. In the present study, the curves for treatment times of 48 and 96 hours are essentially identical, showing that essentially all of the graphite crystals have been converted into graphite oxide with an inter-planar spacing of 6.5-7.5 Å (the 26.3 degree peak has totally disappeared and a peak of approximately at 2θ=11.75-13.7 degrees appeared).

Samples 1A, 1B, and 1C were then subjected to both free thermal exfoliation (1,050° C. for 2 minutes) and constrained thermal expansion/exfoliation (slowly heated from 100° C. to 450° C. in a span of 15 minutes) to obtain thermally exfoliated graphite worms having different ranges of inter-flake pore sizes between different samples.

Exfoliated graphite worms from Samples 1A, 1B, and 1C were then roll-pressed to obtain flexible graphite sheets (foil) having thickness values of 100 µm, 500 µm, and 1 mm.

Example 12: Preparation of Graphite Oxide (GO) Using a Modified Hummers' Method and Graphite Worms Therefrom Graphite oxide (Sample 3A) was prepared by oxidation of natural graphite flakes with sulfuric acid, sodium nitrate, and potassium permanganate according to the method of Hummers [U.S. Pat. No. 2,798,878, Jul. 9, 1957]. In this example, for every 1 gram of graphite, we used a mixture of 22 ml of concentrated sulfuric acid, 2.8 grams of potassium permanganate, and 0.5 grams of sodium nitrate. The graphite flakes were immersed in the mixture solution and the reaction time was approximately one hour at 35.degree. C. It is important to caution that potassium permanganate should be gradually added to sulfuric acid in a well-controlled manner to avoid overheat and other safety issues. Upon completion of the reaction, the mixture was poured into deionized water and filtered. The sample was then washed repeatedly with deionized water until the pH of the filtrate was approximately 5. The slurry was spray-dried and stored in a vacuum oven at 60° C. for 24 hours. The interlayer spacing of the resulting laminar graphite oxide was determined by the Debye-Scherrer X-ray technique to be approximately 0.73 nm (7.3 Å). Some of the powder was subsequently exfoliated in a furnace, pre-set at 950-1,100° C., for 2 minutes to obtain thermally exfoliated graphite worms. Some of the graphite worms were compressed to obtain flexible graphite foil.

Example 13: Oxidation of Meso-Carbon Micro-Beads (MCMBs)

Graphite oxide (Sample 3A) was prepared by oxidation of meso-carbon micro-beads (MCMBs) according to the same procedure used in Example 1, but for a shorter period of time (<48 hours). MCMB microbeads (Sample 3a) were supplied by China Steel Chemical Co. (Taiwan). This material has a density of about 2.14 g/cm$^3$; a particle size of 25 microns; and an inter-planar distance of about 0.336 nm. After deep oxidation treatment, the inter-planar spacing in the resulting graphite oxide micro-beads is approximately 0.7 nm. Upon constrained expansion/exfoliation for 3 minutes at 200° C., the exfoliated carbon has inter-flake pores with a size of 3 nm-15 nm. Exfoliated carbon worms were then roll-pressed to obtain graphitic films.

Example 14: Fluorination of Carbon Fibers to Produce Exfoliated Graphite and Flexible Graphite Sheets A CF$_{0.68}$ sample obtained in EXAMPLE 3 was exposed at 250° C. and 1 atmosphere to vapors of 1,4-dibromo-2-butene (BrH$_2$C—CH=CH—CH$_2$Br) for 3 hours. It was found that two-thirds of the fluorine was lost from the graphite fluoride sample. It is speculated that 1,4-dibromo-2-butene actively reacts with graphite fluoride, removing fluorine from the graphite fluoride and forming bonds to carbon atoms in the graphite lattice. The resulting product (Sample 6A) is mixed halogenated graphite, likely a combination of graphite fluoride and graphite bromide. Some of powders were thermally exfoliated to obtain exfoliated carbon fibers, which were re-compressed to obtain flexible graphite foil (flexible fluorinated graphite sheets).

Example 15: Fluorination of Graphite to Produce Exfoliated Graphite and Flexible Graphite Sheets Natural graphite flakes, a sieve size of 200 to 250 mesh, were heated in vacuum (under less than 10-2 mmHg) for about 2 hours to remove the residual moisture contained in the graphite. Fluorine gas was introduced into a reactor and the reaction was allowed to proceed at 375° C. for 120 hours while maintaining the fluorine pressure at 200 mmHg. This was based on the procedure suggested by Watanabe, et al. disclosed in U.S. Pat. No. 4,139,474. The powder product obtained was black in color. The fluorine content of the product was measured as follows: The product was burnt according to the oxygen flask combustion method and the fluorine was absorbed into water as hydrogen fluoride. The amount of fluorine was determined by employing a fluorine ion electrode. From the result, we obtained a GF (Sample 5A) having an empirical formula $(CF_{0.75})_n$. X-ray diffraction indicated a major (002) peak at 2θ=13.5 degrees, corresponding to an inter-planar spacing of 6.25 Å. Some of the graphite fluoride powder was thermally exfoliated to form graphite worms, which were air jet-milled to obtain expanded graphite flakes. The expanded graphite flakes were then compressed into graphitic sheets.

Example 16: Preparation of Polybenzoxazole (PBO) Films, Graphene-PBO Films, and Expanded Graphite Flake-PBO Films (Followed by Carbonization/Graphitization to Produce Pyrolytic Films)

Polybenzoxazole (PBO) films were prepared via casting and thermal conversion from its precursor, methoxy-containing polyaramide (MeO-PA). Specifically, monomers of 4, 4'-diamino-3,3'-dimethoxydiphenyl (DMOBPA), and isophthaloyl dichloride (IPC) were selected to synthesize PBO precursors, methoxy-containing polyaramide (MeO-PA) solution. This MeO-PA solution for casting was prepared by polycondensation of DMOBPA and IPC in DMAc solution in the presence of pyridine and LiCl at −5° C. for 2 hr, yielding a 20 wt % pale yellow transparent MeO-PA solution. The inherent viscosity of the resultant MeO-PA solution was 1.20 dL/g measured at a concentration of 0.50 g/dl at 25° C. This MeO-PA solution was diluted to a concentration of 15 wt % by DMAc for casting.

The as-synthesized MeO-PA was cast onto a glass surface to form thin films (35-120 μm) under a shearing condition. The cast film was dried in a vacuum oven at 100° C. for 4 hr to remove the residual solvent. Then, the resulting film with thickness of approximately 28-100 μm was treated at 200° C.-350° C. under N$_2$ atmosphere in three steps and annealed for about 2 hr at each step. This heat treatment serves to thermally convert MeO-PA into PBO films. For comparison, both graphene-PBO and expanded graphite flake-PBO films were made under similar conditions. The graphene or EP flake proportions were varied from 10% to 90% by weight.

All the films prepared were pressed between two plates of alumina while being heat-treated (carbonized) under a 3-sccm argon gas flow in three steps: from room temperature to 600° C. in 1 h, from 600 to 1,000° C. in 1.5 h, and maintained at 1,000° C. for 1 h. The carbonized films were then roll-pressed in a pair of rollers to reduce the thickness by approximately 40%. The roll-pressed films were then subjected to graphitization treatments at 2,200° C. for 5 hours, followed by another round of roll-pressing to reduce the thickness by typically 20-40%.

The thermal conductivity values of a series of graphitic films derived from graphene-PBO films of various graphene weight fractions (from 0% to 100%) were measured. Significantly and unexpectedly, some thermal conductivity values are higher than those of both the film derived from PBO alone (860 W/mK) and the graphene paper derived from graphene sheets alone (645 W/mK). Quite interestingly, the neat PBO-derived graphitic films prepared under identical conditions exhibit a highest conductivity value of 860

W/mK, yet several combined graphene-PBO films, when carbonized and graphitized, exhibit thermal conductivity values of 924-1,145 W/mK.

The thermal conductivity values of a series of graphitic films derived from EP-PBO films of various weight fractions of expanded graphite flakes (EP, from 0% to 100%) were also obtained.

Example 17: Preparation of Polyimide (PI) Films, Graphene-PI Films, and the Heat Treated Versions Thereof The synthesis of conventional polyimide (PI) involved poly(amic acid) (PAA, Sigma Aldrich) formed from pyromellitic dianhydride (PMDA) and oxydianiline (ODA). Prior to use, both chemicals were dried in a vacuum oven at room temperature. Next, 4 g of the monomer ODA was dissolved into 21 g of DMF solution (99.8 wt %). This solution was stored at 5° C. before use. PMDA (4.4 g) was added, and the mixture was stirred for 30 min using a magnetic bar. Subsequently, the clear and viscous polymer solution was separated into four samples. Triethyl amine catalyst (TEA, Sigma Aldrich) with 0, 1, 3, and 5 wt % was then added into each sample to control the molecular weight. Stirring was maintained by a mechanical stirrer until the entire quantity of TEA was added. The as-synthesized PAA was kept at −5° C. to maintain properties essential for further processing.

Solvents utilized in the poly(amic acid) synthesis play a very important role. Common dipolar aprotic amide solvents utilized are DMF, DMAc, NMP and TMU. DMAc was utilized in the present study. The intermediate poly(amic acid) and NGP-PAA precursor composite were converted to the final polyimide by the thermal imidization route. Films were first cast on a glass substrate and then allowed to proceed through a thermal cycle with temperatures ranging from 100° C. to 350° C. The procedure entails heating the poly(amic acid) mixture to 100° C. and holding for one hour, heating from 100° C. to 200° C. and holding for one hour, heating from 200° C. to 300° C. and holding for one hour and slow cooling to room temperature from 300° C.

The PI films, pressed between two alumina plates, were heat-treated under a 3-sccm argon gas flow at 1000° C. This occurred in three steps: from room temperature to 600° C. in 1 h, from 600 to 1,000° C. in 1.3 h, and 1,000° C. maintained for 1 h.

Figure 5:
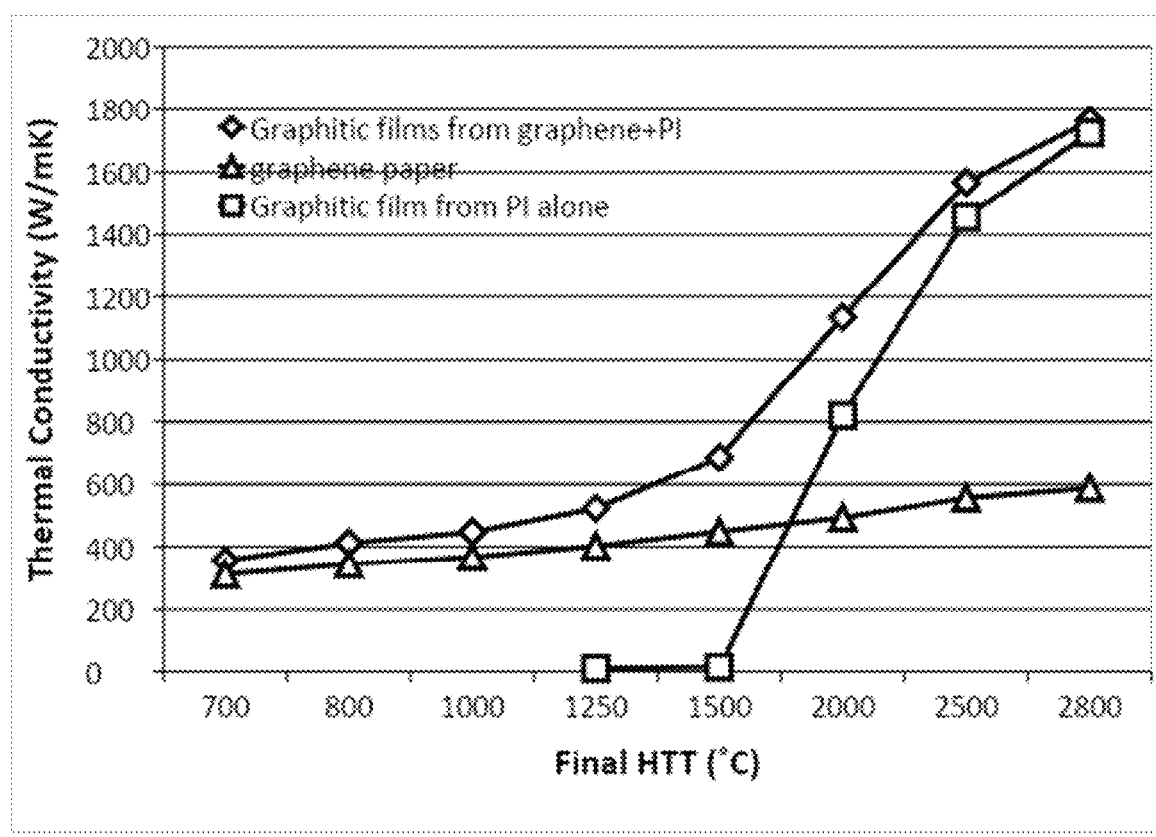
FIG. 5 Thermal conductivity values of a series of graphitic films derived from graphene-PI films (66% graphene+ 34% PI), graphene paper alone, and PI film alone prepared at various final heat treatment temperatures.

The thermal conductivity values of a series of graphitic films derived from graphene-PI films (66% graphene+34% PI), graphene paper alone, and PI film alone each prepared at various final heat treatment temperatures were measured and summarized in FIG. 5.

The invention claimed is:

1. A battery charging system comprising
(a) at least one charging circuit to charge at least one rechargeable battery cell; and
(b) a heating device to provide heat that is transported through a heat spreader element, implemented outside said at least one battery cell and in thermal communication with an external surface of said battery cell, to heat up said battery cell to a desired temperature Tc before or during charging of said battery cell, wherein the heat-spreader element does not receive an electrical current from the charging circuit to generate heat inside the battery cell for internal resistance heating of the battery cell, wherein said battery charging system further comprises (c) a cooling device in thermal communication with the heat spreader element configured to enable transporting internal heat of the battery cell through the heat spreader element to the cooling device when the battery cell is discharged, wherein the cooling device is not in thermal contact with the heat spreader element when the battery cell is heated by the heating device, wherein the cooling device includes both a thermal interface portion and a cooling portion, wherein the heating device or the cooling device has a connector that selectively engages with a tab of said heat spreader element.

2. The battery charging system of claim 1, wherein the battery is a lithium-ion battery, lithium metal secondary battery, lithium-sulfur battery, lithium-air battery, lithium-selenium battery, sodium-ion battery, sodium metal secondary battery, sodium-sulfur battery, sodium-air battery, magnesium-ion battery, magnesium metal battery, aluminum-ion battery, aluminum metal secondary battery, zinc-ion battery, zinc metal battery, zinc-air battery, nickel metal hydride battery, lead acid battery, lead acid-carbon battery, lead acid-based ultra-battery, lithium-ion capacitor, or supercapacitor.

3. A battery module or pack that comprises a plurality of battery cells in charging/discharging relation to the battery charging system of claim 1.

4. The battery charging system of claim 1, wherein said heat spreader element comprises a material selected from a graphene film, flexible graphite foil, artificial graphite film, or a combination thereof.

5. The battery charging system of claim 4, wherein said graphene film contains a graphene selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof.

6. The battery charging system of claim 1, wherein said rechargeable battery cell comprises a protective housing and said heat-spreader element is disposed outside the protective housing and configured to alternate between receiving heat from said heating device at a desired heating temperature $T_h$ to heat up the battery cell to the desired temperature Tc for battery cell charging and transferring heat from the battery cell to the cooling device when the battery cell is discharged to provide electric power to an external device or load.

7. The battery charging system of claim 1, wherein said system comprises multiple charging stations to heat and charge multiple rechargeable battery cells and wherein each charging station comprises one charging circuit and one heating device.

8. The battery charging system of claim 1, wherein the heat spreader element contains a thermal film that receives electrical current from said charging circuit to generate heat inside the heat spreader element via resistance heating of the thermal film before or during battery charging and wherein the thermal film is selected from graphene film, flexible graphite foil, or artificial graphite film.

9. The battery charging system of claim 1, wherein said heat spreader element comprises a high thermal conductivity material having a thermal conductivity no less than 200 W/mK.

10. The battery charging system of claim 1, further comprising a thermal interface material (TIM) disposed between at least one of the battery cells and the heat spreader element.

11. The battery charging system of claim 10, wherein said thermal interface material comprises a material selected from graphene sheets, graphene foam, graphene-containing paste, graphite flake-containing paste, graphene-containing polymer composite, flexible graphite sheet, artificial graphite film, Ag, Ag, Cu, Al, brass, steel, Ti, Ni, Mg alloy, silicon nitride, boron nitride, aluminum nitride, boron arsenide, a composite thereof, or a combination thereof.

12. The battery charging system of claim 1, wherein said thermal interface material comprises a graphene foam having a thermal conductivity from 0.1 W/mK to 100 W/mK and said heat spreader element comprises a graphene film or an artificial graphite film having a thermal conductivity from 600 W/mK to 1,800 W/mK.

13. The battery charging system of claim 1, wherein said heat spreader element is in a form of a film, sheet, layer, belt, or band having a thickness from about 100 nm to 10 mm.

14. The battery charging system of claim 1, wherein the heating device produces heat by using laser heating, resistance heating, dielectric heating, thermal-electric heating, microwave heating, radio frequency heating, hot fluid heating, or a combination thereof.

15. The battery charging system of claim 1, wherein the cooling device is a heat sink, a heat pipe, a vapor chamber, a stream of flowing fluid, a bath of a coolant fluid, a thermoelectric device, a heat exchanger, a cooled plate, a radiator, or a combination thereof.

16. The battery charging system of claim 1, wherein the heat spreader element is in a heat-spreading relation to an external surface of a battery cell and provides heat thereto before or during charging of the battery cell or receives heat therefrom when the battery cell is discharged to power an external device.

\* \* \* \* \*